United States Patent [19]

Sanyal et al.

[11] Patent Number: 5,217,616
[45] Date of Patent: Jun. 8, 1993

[54] PROCESS AND APPARATUS FOR REMOVAL OF ORGANIC POLLUTANTS FROM WASTE WATER

[75] Inventors: Sugata Sanyal, Somerset; Timothy P. Love, Flemington, both of N.J.; Louis J. DeFilippi, Mt. Prospect, Ill.

[73] Assignee: Allied-Signal Inc., Morristown, N.J.

[21] Appl. No.: 802,931

[22] Filed: Dec. 6, 1991

[51] Int. Cl.$^5$ ............................................. C02F 3/06
[52] U.S. Cl. ........................... 210/617; 210/150; 55/74; 55/233; 435/266
[58] Field of Search ............... 210/150, 151, 615, 616, 210/617, 618, 631; 55/74, 233, 387; 261/94, 95; 435/262, 266

[56] References Cited

U.S. PATENT DOCUMENTS

| | | | |
|---|---|---|---|
| 2,188,162 | 1/1940 | Schulhoff | 210/150 |
| 2,200,580 | 5/1940 | Prüss et al. | 210/617 |
| 2,364,298 | 12/1944 | Kamp | 210/150 |
| 3,232,865 | 2/1966 | Quinn et al. | 210/150 |
| 3,293,174 | 12/1966 | Robjohns | 210/150 |
| 3,371,033 | 2/1968 | Simmons et al. | 210/150 |
| 3,452,871 | 7/1969 | Hoover et al. | 210/150 |
| 4,427,548 | 1/1984 | Quick, Jr. | 210/150 |
| 4,708,792 | 11/1987 | Takarabe et al. | 210/150 |
| 4,800,021 | 1/1989 | Desbos | 210/150 |
| 4,842,920 | 6/1989 | Banai et al. | 210/150 |

FOREIGN PATENT DOCUMENTS 2739236  3/1979 Fed. Rep. of Germany.
3716637 12/1988 Fed. Rep. of Germany.

OTHER PUBLICATIONS

"Perry's Chemical Engineer's Handbook" pp. 18-23 6th ed, 1984.

Primary Examiner—Stanley S. Silverman
Assistant Examiner—Christopher Upton
Attorney, Agent, or Firm—Michael U. Lee; Richard Stewart; Gerhard Fuchs

[57] ABSTRACT

This invention relates to a process for reducing the concentration of an organic and/or inorganic pollutant in a fluid stream which comprises passing the stream through a bioreactor containing a fixed biologically active biomass comprising an effective number of open or substantially open spaces and a plurality of biologically active bodies comprising a hydrophobic polyurethane substrate having an effective amount of one or more microorganism capable of metabolizing at least one of the said pollutant on, in or on and in said substrate in the absence or in the substantial absence of an absorbent.

108 Claims, 10 Drawing Sheets

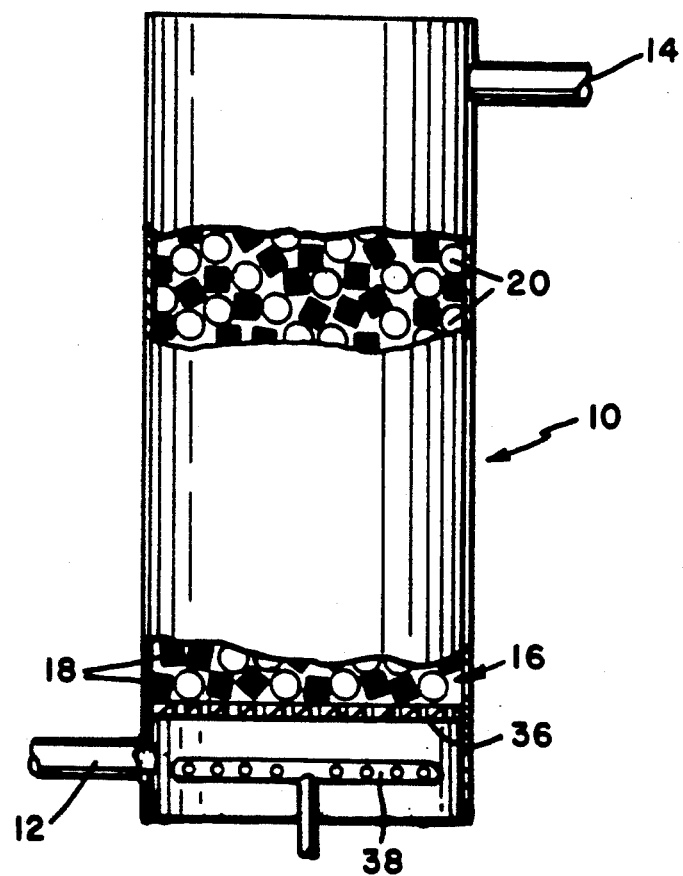
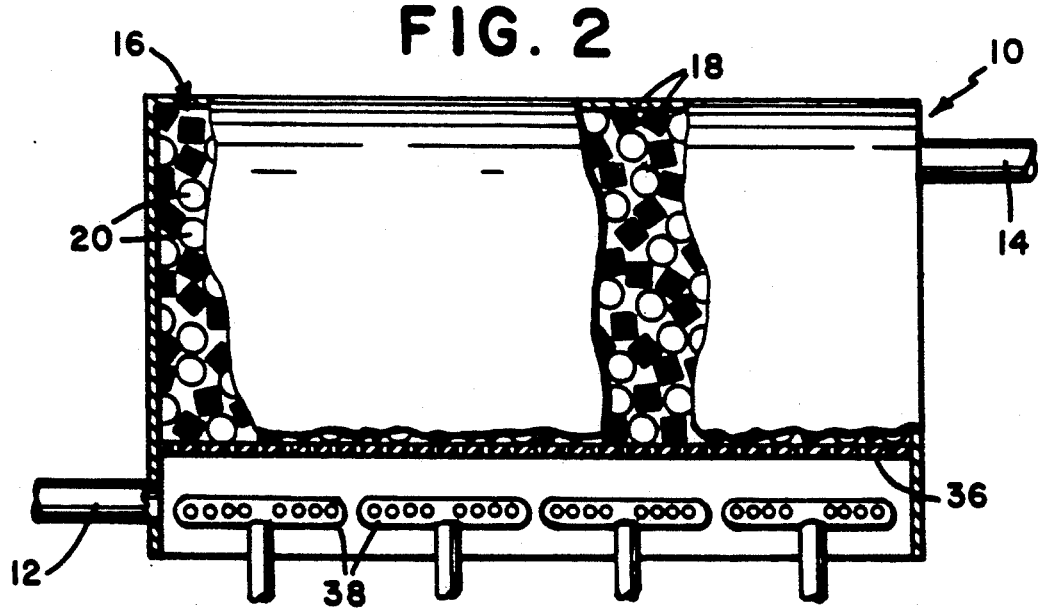

PROCESS AND APPARATUS FOR REMOVAL OF ORGANIC POLLUTANTS FROM WASTE WATER

BACKGROUND OF THE INVENTION

1. Field of the Invention

This invention relates to a process for the removal of organic and/or inorganic pollutants from waste water. More particularly, this invention relates to a process for removal of such pollutants especially substituted and unsubstituted phenols by aerobic biodegradation using a porous biomass support system in a fixed bed reactor.

2. Prior Art

One of the hallmarks of contemporary civilization is that each increment of technological progress almost invariably is accompanied by a similar increment of environmental regress. As the pace of technological advances quickens, so does the march of environmental deterioration. The realization of environmental damage has occurred only relatively recently, so that present society sometimes finds itself burdened with the accumulated sins of the not-too-distant past. But another hallmark of current society is its acceptance of the undesirability of environmental degradation coupled with a determination to minimize and even reverse it wherever possible. Although the return of ground waters to their pristine condition of an earlier era is not a realistic goal, there is a genuine determination to make our waters as pure as possible. Environmental agencies have set limits for many common industrial pollutants, and as methods of pollution, reduction have become more successful in reducing or removing pollutants from waste water, environmental regulations have become more stringent, resulting in an ever tightening spiral whose goal is to reduce pollutants in waste water to that minimum which is technologically feasible.

Among the methods employed to reduce or remove pollutants, bioremediation constitutes an effective and highly desirable approach. Quite broadly, in bioremediation pollutants serve as a food source, generally as a source of carbon and/or nitrogen, for microorganisms. Bacterial metabolism converts the pollutants to metabolites generally with a simple chemical structure, sometimes degrading the pollutants completely to carbon dioxide and water in an aerobic process, or to methane in an anaerobic process. But in any event, the metabolites usually have no adverse environmental effects.

Various bioremediation processes are known. For example, U.S. Pat. No. 4,634,672 describes biologically active compositions for purifying waste water and air which comprises a polyurethane hydrogel containing (i) surface active coal having a specific surface according to BET of above 50 $m^2/g$, a polymer having cationic groups and cells having enzymatic activity and being capable of growth. U.S. Pat. No. 4,681,852 describes a process for biological purification of waste water and/or air by contacting the water or air with the biologically active composition of U.S. Pat. No. 4,634,672. The experimental examples of these patents indicate that the process is not effective for reducing contaminant concentrations in the effluent strain to less than 44 parts per million (ppm). This is not acceptable since the Environmental Protection Agency (EPA) in some instances has mandated that concentration for some contaminants (such as phenol) in the effluent stream must be as low as 20 parts-per-billion (ppb). (See Environmental Protection Agency 40 CFR Parts 414 and 416. Organic Chemicals and Plastics and Synthetic Fibers Category Effluent Limitations Guidelines, Pretreatment Standards, and New Source Performance Standards. Federal Register, Vol. 52, No. 214, Thursday, Nov. 5, 1989. Fuels & Regulations, 42522.

Both U.S. Pat. Nos. 3,904,518 and 4,069,148 describe the addition of activated carbon or Fuller's earth to a suspension of biologically active solids (activated sludge) in waste water as an aid in phenol removal. The absorbents presumably act by preventing pollutants toxic to the bacteria from interfering with bacterial metabolic activity. The patentees' approach has matured into the so-called PACT process which has gained commercial acceptance despite its requisites of a long residence time, copious sludge formation with attendant sludge disposal problems, and the need to regenerate and replace spent carbon.

Rehm and coworkers have further refined the use of activated carbon in the aerobic oxidation of phenolic materials by using microorganisms immobilized on granular carbon as a porous biomass support system. Utilizing the propensity of microorganisms to grow on and remain attached to a surface, Rehm used a granular activated carbon support of high surface area (1300 $m^2/g$) to which cells attached within its macropores and on its surface, as a porous biomass support system in a loop reactor for phenol removal. H.M. Ehrhardt and H.J. Rehm, Appl. Microbiol. Biotechnol., 21, 32-6 (1985). The resulting "immobilized" cells exhibited phenol tolerance up to a level in the feed of about 15 g/L, whereas free cells showed a tolerance not more than 1.5 g/L. It was postulated that the activated carbon operated like a "buffer and depot" in protecting the immobilized microorganisms by absorbing toxic phenol concentrations and setting low quantities of the absorbed phenol free for gradual biodegradation. This work was somewhat refined using a mixed culture immobilized on activated carbon [A. Morsen and H.J. Rehm, Appl. Microbiol. Biotechnol., 26, 283-8 (1987)] where the investigators noted that a considerable amount of microorganisms had "grown out" into the aqueous medium, i.e., there was substantial sludge formation in their system.

Suidan and coworkers have done considerable research on the analogous anaerobic degradation of phenol using a packed bed of microorganisms attached to granular carbon [Y.T. Wang, M.T. Suidan and B.E. Rittman, Journal Water Pollut. Control Fed., 58 227-33 (1986)]. For example, using granular activated carbon of 16×20 mesh as a support medium for microorganisms in an expanded bed configuration, and with feed containing from 358-1432 mg phenol/L, effluent phenol levels of about 0.06 mg/L (60 ppb) were obtained at a hydraulic residence time (HRT) of about 24 hours. Somewhat later, a berl-saddle-packed bed and expanded bed granular activated carbon anaerobic reactor in series were used to show a high conversion of COD to methane, virtually all of which occurred in the expanded bed reactor; P.Fox, M.T. Suidan, and J.T. Pfeffer, ibid., 60, 86-92, 1988. The refractory nature of ortho-cresols and meta-cresols toward degradation also was noted.

Givens and Sack, 42nd Purdue University Industrial Waste Conference Proceedings, pp. 93-102 (1987), performed an extensive evaluation of a carbon impregnated polyurethane foam as a microbial support system for the aerobic removal of pollutants, including phenol. Porous polyurethane foam internally impregnated with activated carbon and having microorganisms attached externally was used in an activated sludge reactor, analogous to the Captor and Linpor processes which differ only in the absence of foam-entrapped carbon. The process was attended by substantial sludge formation and without any beneficial effect of carbon.

The Captor process itself utilizes porous polyurethane foam pads to provide a large external surface for microbial growth in an aeration tank for biological waste water treatment. The work described above is the Captor process modified by the presence of carbon entrapped within the foam. A two-year pilot plant evaluation of the Captor process itself showed substantial sludge formation with significantly lower microbial density than had been claimed. J.A. Heidman, R.C. Brenner and H.J. Shah, *J. of Environmental Engineering*, 114, 1077–96 (1988). A point to be noted, as will be revisited below, is that the Captor process is essentially an aerated sludge reactor where the pads are retained in an aeration tank by screens in the effluent line. Excess sludge needs to be continually removed by removing a portion of the pads via a conveyor and passing the pads through pressure rollers to squeeze out the solids.

H. Bettmann and H.J. Rehm, Appl. Microbial. Biotechnol., 22, 389–393 (1985) have employed a fluidized bed bioreactor for the successful continuous aerobic degradation of phenol at a hydraulic residence time of about 15 hours using Pseudomonas Putida entrapped in a polyacrylamide-hydrazide gel. The use of microorganisms entrapped within polyurethane foams in aerobic oxidation of phenol in shake flasks also has been reported; A.M. Anselmo et al., Biotechnology B.L., 7, 889–894 (1985).

U.S. Pat. No. 2,812,031 relates to the extraction of phenolic materials from aqueous solutions by means of polyurethane foam in the presence of hydrophilic fibers. The patent states that while polyurethane foams are relatively hydrophobic which can interfere with the interfacial contact which is necessary to permit adsorption, the problem is overcome through the use of hydrophilic fibers which enable the materials to come into close and in intimate contact with the surfaces of the polyurethane to facilitate wetting thereof.

U.S. Pat. No. 3,617,531 relates to a method for the selective adsorption of phenol from hydrocarbon solutions. In this method, the solution is contacted with a polyurethane foam.

U.S. Pat. No. 4,469,600 describes the biological purification of wastewater in the presence of an open-pore and compressible carrier material for the biomass. U.S. Pat. No. 4,461,708 describes a process for purifying effluent waters, particularly those produced in the wood-processing industry, through use of a fluidized reactor containing finely divided particles and agglomerated fiber material serving the purpose of reducing the quantity of floating particles. U.S. Pat. No. 3,933,629 discloses the biological treatment of an aqueous effluent stream with a filler unit having lower sand layer, an intermediate anthracite layer and a polystyrene layer. U.S. Pat. No. 4,561,974 discloses an apparatus for the anaerobic filtration of waste water which includes a filter of a filling material or the apparatus having a lower layer of a filling material in the form of an ordered arrangement of material, and having upper and intermediate layers, each include a loosely packed arrangement of material thereof.

U.S. Pat. No. 4,589,927 discloses liquid multisolid fluidized bed processing by a liquid fluidized bed reactor in which improved mixing and mass transport between gas/liquid/solid phases is provided by fluidizing large particles in the bottom of the reactor while recirculating small enhanced particles and the liquid through the reactor.

U.S. Pat. No. 4,983,299 and PCT WO 90/11970 describe fixed bed reactors for the bioremediation or organic contaminants where the reactor contains a biomass formed from particles having a substrate such as polyurethane foam having anaerobic microbes and an absorbent for the pollutant on, in or on all in said substrate.

U.S. Pat. No. 4,165,281 discloses a method and a unit for wastewater treatment with microorganisms, in which at least one non-woven fibrous mat having a three-dimensional network structure is disposed as a supporting media in an aeration tank, microorganisms are retained on the surface of and in the interstices of the non-woven fibrous mat, and organic polluting matter in the wastewater is oxidatively decomposed by the microorganisms in the presence of oxygen.

U.S. Pat. No. 4,820,415 discloses a process for the biological treatment of an aqueous waste containing liquid by the removal of organic matter by microorganisms wherein a carrier material for said microorganisms is added to said liquid and wherein said carrier material comprises a filler-containing, hydrophilic, open-celled polymer in the form of separate individual particles, the improvement wherein said polymer particles, when saturated with water and charged with at least 70 volume % of biomass formed in the course of the process, have an average density of slightly below the density of said liquid and thereby are suspended in the upper two-thirds of said liquid.

U.S. Pat. No. 4,469,600 describes the biological purification of wastewater in a reactor in the presence of open-pore and compressible carrier material for biomass, the carrier material, prior to its use in the reactor, is loaded with bacteria, finely divided, inorganic and/or organic compounds, selected for wastewater purification, and is then either stored or used in the process, the loaded carrier being especially useful for decreasing the start-up time of a wastewater treatment plant.

U.S. Pat. No. 4,576,718 relates to the use of non-floating, non-abrasive, highly-filled polyurethane (urea) compositions of high water-absorbability, which during their production contain no cells capable of growth as carriers for biomass in the biological treatment of waste containing liquids. These carriers have a filler content of greater than 15% by weight and less than 95% by weight (based on the moisture-free). The fillers are selected from the group consisting of natural materials containing finely-divided fossil lignocellulose or the secondary products thereof (e.g., peat, lignite, mineral coal or coke), active carbon, finely-divided distillation residues, inorganic fillers, homogeneous or cellular plastics particles (and more particularly polyurethane foam (waste) particles) and mixtures thereof. The polyurethane (urea) is a hydrophilic and/or hydrophobic polyurethane(urea), and preferably contains cationic groups. These highly-filled, polyurethane (urea) carriers have a water-absorbability exceeding 33% by weight of water in the swollen carrier.

U.S Pat. No. 5,037,551 discloses a method and an apparatus for dehalogenation and further biodegrading organic compounds, including halogenated organic compounds, present in an aqueous mixture, the mixture comprising the waste effluent produced in a continuous high flow rate by an industrial plant such as a bleach pulp or paper mil using chlorine and chlorine compounds. The aqueous mixture is passed through at least one combination of a first oxygen-enriched liquid zone and a second zone containing a mixed population of methanotrophic and heterotrophic microorganisms supported on a substrate bed. A first gas including oxygen is flowed through the first zone and second gas consisting substantially of a low-molecular-weight alkane is flowed through the second zone as the aqueous mixture passes through the first and second zones. The microorganisms supported by the bed dehalogenated and further biodegrade the organic compounds in the aqueous liquid flowing through the bed as they aerobically metabolize the low-molecular-weight alkane. The first zone may be hydraulically coupled to an upstream aerobic biopond for decreasing the total organic carbon and biochemical oxygen demand of the aqueous mixture before the mixture is passed through the first and second zones. A plurality of paired first and second zones may be hydraulically interconnected to achieve a higher degree of dehalogenation and further biodegradation of organic compounds in the aqueous mixture flowing therethrough and/or to accommodate higher flow rate.

SUMMARY OF THE INVENTION

This invention relates to a process for purification of a fluid stream comprising one or more materials by biodegradation with one or more microorganisms capable of metabolizing one or more of said materials, said process comprising:

passing a fluid feed stream comprising one or more materials through a reactor containing a fixed biologically active biomass comprising an effective number of open or substantially open spaces and a plurality of biologically active bodies, said bodies comprising a substrate, and an effective amount of one or more microorganisms capable of metabolizing at least one of said materials in said feed stream under process conditions on, in or on and in said substrate, and said bodies having a surface to volume ratio which is greater than that of said open or substantially open spaces, said bodies and said spaces distributed in said biomass to allow contact between said feed stream passing through said open or substantially open spaces and all or a portion of the internal and external surfaces of all or a portion of said bodies adjacent to said spaces to provide an effluent stream in which the concentration of at least one of said materials is less than the concentration of said material in said feed stream.

Another aspect of this invention relates to an apparatus for purification of a fluid stream comprising one or more materials by biodegradation with one or more microorganisms capable of metabolizing one or more of said materials, said apparatus comprising:

a reactor having an inlet for in-flow of a fluid feed stream containing one or more materials and an outlet for out-flow of an effluent stream in which the concentration of at least one of said materials is less than the concentration of said material in said feed stream, and having contained in said reactor a fixed biologically active biomass comprising an effective number of open or substantially open spaces and a plurality of biologically active bodies, said bodies comprising a substrate and an effective amount of one or more microorganisms capable of metabolizing at least one of said materials in said feed stream under process conditions on, in, or on and in said substrate, and said bodies having a surface to volume ratio which is greater than that of said open or substantially open spaces, said bodies and said spaces distributed in said biomass to allow contact between said feed stream passing through said open or substantially open spaces and all or a portion of the internal and external surfaces of all or a portion of said bodies adjacent to said spaces.

Yet another aspect of this invention relates to a biomass for use in an apparatus for purification of a fluid stream comprising one or more materials by biodegradation with one or more microorganisms capable of metabolizing one or more of said materials, said biomass comprising:

an effective number of open or substantially open spaces and a plurality of biologically active bodies, said bodies comprising a substrate and an effective amount of one or more microorganisms capable of metabolizing at least one of said materials in said feed stream under process conditions on, in, or on and in said substrate, and said bodies having a surface to volume ratio which is greater than that of said open or substantially open spaces, said bodies and said spaces distributed in said biomass to allow contact between said feed stream passing through said open or substantially open spaces and all or a portion of the internal and external surfaces of all or a portion of said bodies adjacent to said spaces to provide an effluent stream in which the concentration of at least one of said materials is less than the concentration of said material in said feed stream.

The process, apparatus and biomass of this invention provide for improved rate, efficiency and/or controllability of the bioremediation process which are believed due to improved contact and distribution of liquid, gas and/or solid phases in process, apparatus and biomass as compared to prior art processes, biomass and apparatus having the same physical and operational parameters i.e. configuration, components, hydraulic pressure, etc., but using solely said bodies. A result is that the process, apparatus and biomass of this invention provide improved bioremediation, maintenance of desired concentration levels in the effluent stream when relatively large fluctuations in concentration levels in the feed stream as compared to known processes, apparatus and biomass incorporating solely said bodies in the absence or substantial absence of open or substantially open spaces. In a preferred embodiment of this invention where the biologically active bodies are formed of a flexible polymeric foam which is compressible under operational pressures used during the conduct of bioremediation process, the apparatus and biomass of this invention also provide for reduced compression of the bodies as compared to prior art processes, apparatus and biomass as using the same structural and operational parameters but using said bodies in the absence or substantial absence of open or substantially open spaces.

BRIEF DESCRIPTION OF THE DRAWINGS

The invention will be more fully understood and further advantages will become apparent when reference is made to the following detailed description of the invention and the accompanying drawings in which:

FIG. 1 is a cross-sectional side view of a vertical reactor for use in a preferred embodiment of the invention.

FIG. 2 is a cross-sectional side view of a horizontal reactor for use in the process of this invention.

DETAILED DESCRIPTION OF THE PREFERRED EMBODIMENTS OF THE INVENTION

Figure 3:
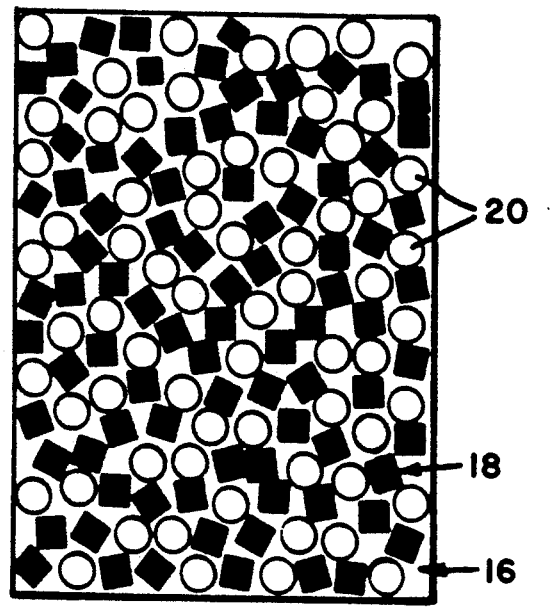
FIG. 3 is a cross-sectional view of a bioreactor for use in this invention comprising a plurality of dispersed biologically active bodies and a plurality of dispersed substantially open spaces.

The present invention will be better understood by those of skill in the art by reference to the figures. Referring to FIGS. 1 and 2, the numeral 10 indicates a reactor for use in the process of this invention. In FIGS. 1 and 2, are depicted reactors 10 for biodegradation of materials contained in a feed stream by aerobic or anaerobic microbes As used herein, the term "biodegradation" includes metabolic decomposition of organic compounds into compounds of lower molecular weight, metabolic conversion of inorganic nitrogen containing species such as $NH_3$ and $NO^-_3$, $NO^-_2$ etc. into nitrogen gas; and dehalogenation, the removal of halogen atoms, such as chlorine atoms, from halogenated organic compounds.

Reactors 10 in FIGS. 1 and 2 are vertical and horizontal reactors, respectively, of a specific design and configuration. However, in the practice of this invention, design and configuration and the materials of construction may vary widely and other reactor designs and configuration may be conveniently used in the practice of this invention provided that all or a portion of the reactive bed is a fixed bed or substantially fixed bed. As used herein a "fixed bed or substantially fixed bed reactor" is a reactor in which the plurality of biologically active particles are stationary or substantially stationary as the feed flows through the reactor.

Reactor 10 contains biomass 16 comprising a plurality of biologically active bodies identified in FIGS. 1 and 2 by the numeral 18 and open or substantially open regions identified in FIGS. 1 and 2 by the numeral 20. Biomass 16 is supported by porous screen or plate 36 having a porosity which is sufficient to allow flow through of an effective amount of gas required for the metabolic processes of the microorganism during bioremediation. Reactor 10 also includes diffusers 38 for introduction of the gas into reactor 10.

Figure 6:
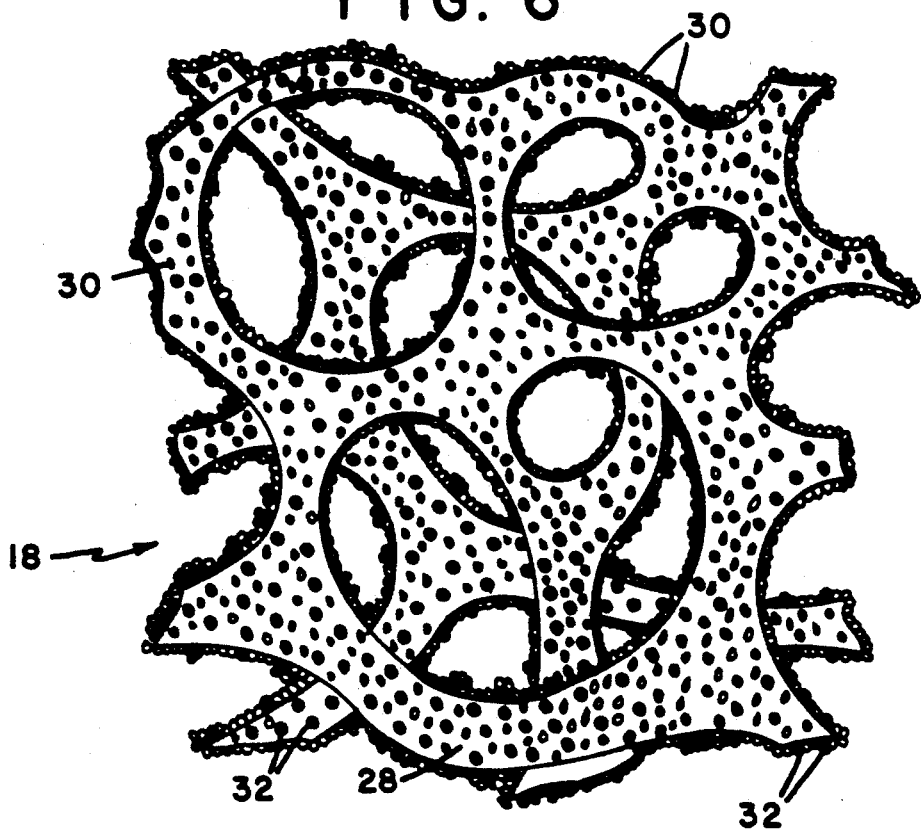
FIG. 6 is a perspective view of a preferred biologically active body for use in the process of this invention having an absorbent for at least one material in the aqueous feed stream on and in a substrate.
Figure 7:
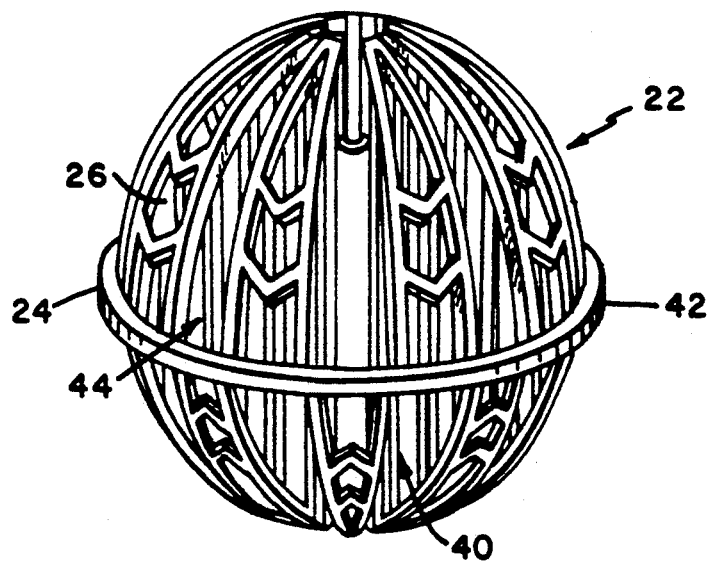
FIG. 7 is a perspective view of a preferred open space body for use in providing an open or substantially open space about all or a portion of the external and internal surfaces of a biologically active body.
Figure 8:
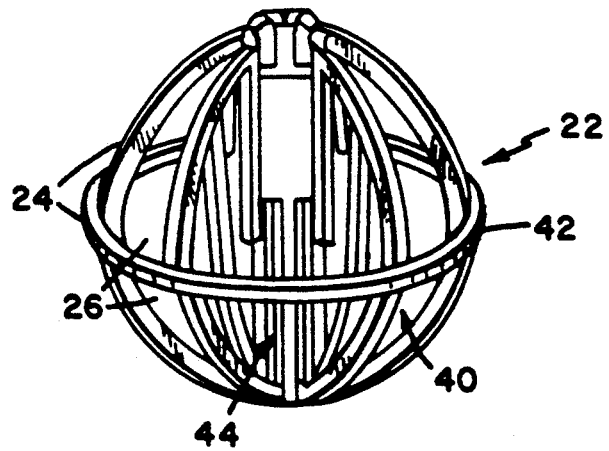
FIG. 8 is a perspective view of a preferred open space body for use in providing an open or substantially open space about all or a portion of the external or internal surfaces of a biologically active body.

As shown in the embodiments of FIGS. 1, 2, 7 and 8, open or substantially open regions 20 are formed from a plurality of open structures 22 (not depicted) which are dispersed around biomass 16. However, any means or structure which is capable of providing for open or substantially open regions 20 can be employed. As depicted in FIGS. 1 to 8, open structures 22 are comprised basically of rigid opens framework 24 which skeletally defining said structures having a plurality of passages 26 thereto which together encompass and define open or substantially open region 20. While shape is not critical, and substantially any shape can be used in the embodiments depicted in FIGS. 7 and 8 structures 22 are spherical or substantially spherical. Framework 24 preferably comprises a plurality of spaces longitudinal or substantially longitudinal ribs 40 converging at the open or poles of structure 22 spherical or substantially spherical. Also as depicted in FIGS. 7 and 8 structure 22 includes at least one latitudinal rib 42 about the circumference of the spherical structure 22, at or about its greater and a plurality of internal vanes, ribs, fins 44 and the like which together define passages 26 through structure 22, for flow through of the fluid stream. During operation, open regions 20 are comprised predominantly of the fluid feed stream flowing through reactor 10 allowing contact with all or substantially all of the internal and external surfaces of all or substantially all bodies 18 contained in biomass 16 as the fluid stream passes through the reactor. To allow each contact, it is required that structures 22 are comprised substantially passages 26 (at least about 40 vol %, preferably at least about 50 vol %, more preferably at least about 80 vol % and most preferably at least about 95 vol % based on the total volume of structures) such that the surface to volume ratio of structures 22 is less than that of bodies 18, and that passages 26 and framework 24 are positioned or distributed in structures 22 so as to allow flow of the fluid stream through structures 22 to allow contact between the fluid-stream flowing through reactor 10 and the external and internal surfaces of adjacent bodies 18 of the desired number of bodies 16 to the desired extent.

Figure 4:
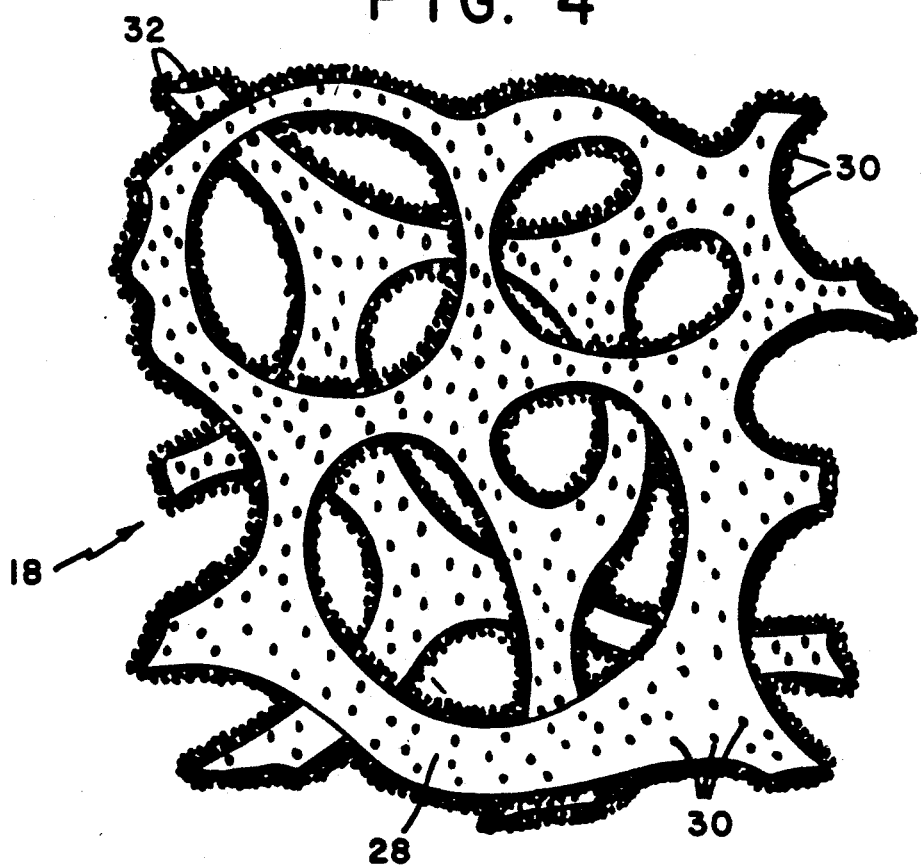
FIG. 4 is a cross-sectional view of a preferred biologically active body for use in the process of this invention having an absorbent for at least one of the materials in the feed stream on the surface of a substrate.
Figure 5:
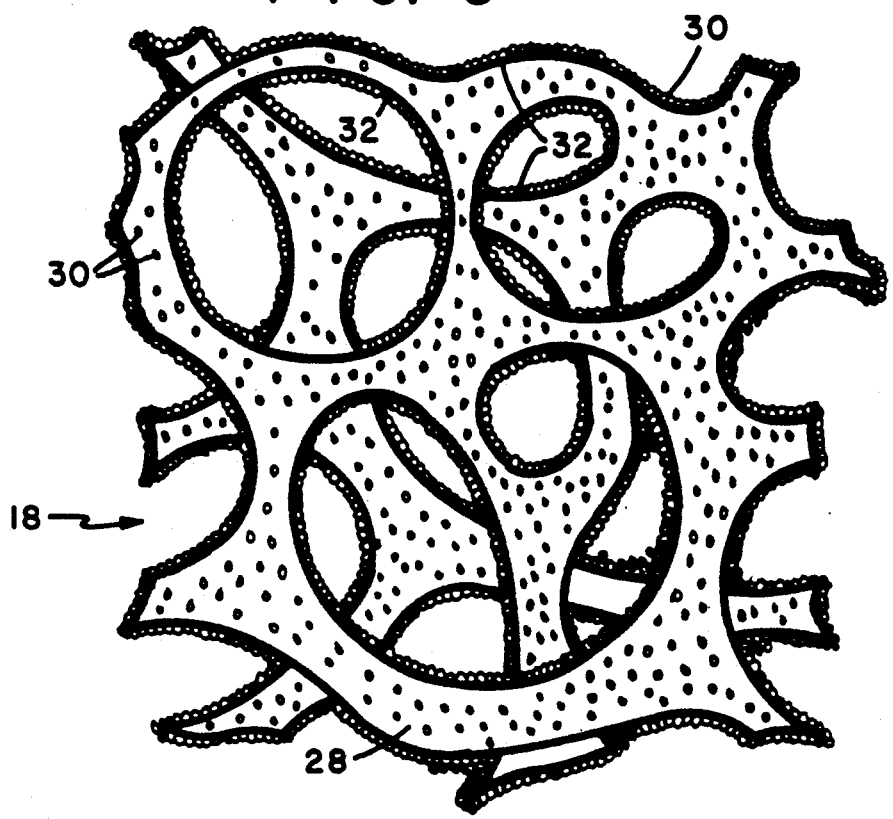
FIG. 5 is a cross-sectional view of a preferred biologically active body for use in the process of this invention in which the surface of the body is an absorbent for at least one of the materials in the aqueous stream.

As depicted in FIGS. 4 to 6, biologically active bodies 18 comprise a substrate 28. Biologically active bodies 18 also include one or more types of microorganisms 30 usually aerobic or anaerobic, and preferably aerobic which are capable of metabolizing at least one of the materials contained in the waste stream on, in or on and in substrate 28. Although an optional component, it is preferred that bodies 18 also include some capacity for absorbing one or more of the materials from the fluid feed stream to enhance the biodegradation of the material by the microorganisms. As shown in FIG. 4, this function can be provided by placing the desired amount of absorbent 32 which are capable of absorbing, adsorbing or absorbing and adsorbing at least one material in the feed stream on all or a part of the portion of substrate 28 forming the outer surface of body 18. On the other hand, as depicted in FIG. 5 where the material forming that portion of substrate 28 which forms the outer surface of body 18 itself may absorbs, adsorbs, absorbs and adsorbs the desired material as for example a hydrophobic polyurethane no absorbent 32 is required. In those instances where body 18 is such that absorbent 32 can be placed on and in, or in substrate such may be done as depicted in FIG. 6. The relative positioning and relative proportions of biologically active bodies 18 and the open or substantially open regions 20 defined by said structures 22 in biomass 16 are critical to the advantage of this invention. Such proportions, and positioning are such as to provide contact between the fluid feed stream comprising predominantly said one or more of said open regions 20 and all or a portion of the external or internal surfaces of said body 18 adjacent to said region 20. While we do not wish to the bound by any theory, it is believed that such positioning and proportions result in the enhanced gas/liquid/solid distribution in biomass 16 and therefore enhances contact between the material to the biodegraded in the fluid stream flowing through regions 20 and microbes 32 on, in and on and in substrate 28 of body 18 which enhances the effectiveness of the biodegradation process. An advantage of enhanced distribution is that the bioremediation process, apparatus and biomass of this invention are more effective than analogous prior art process, apparatus and biomass and processes in which the biomass is primarily composed of biologically active bodies 16 such as those described in U.S. Pat. No. 4,576,718 and 4,983,299, and PCT WO 90/11970. Moreover, data shows that another advantage over these prior art processes, reactors and biomass is believed to result from enhanced distribution is enhanced resistance to upset.

In general, the relative proportions and relative positioning of bodies 18 and open regions 20 in biomass 16 of a first reactor 10 are such that bulk removal rate of at least one material from the feed stream at a residence time of about 13 hours is greater than that of a second reactor of same configuration, and components operated in the same manner as the first reactor 10 of this invention where the second reactor incorporates solely said bodies 18 in the absence or substantial absence of open species 22 where the number of bodies 18 in said second reactor is equal to the sum of regions 20 and bodies 18 in said first reactor. The relative positioning and proportions of bodies 18 and regions 20 are preferably such that the bulk removal rate of the first reactor of this invention is more than about 10%, preferably equal to or greater than about 20%, more preferably equal to or greater than about 30% and most preferably from about 50 to about 100% of that of the second reactor in which the biomass is solely bodies 18. Bodies 18 and regions 20 are preferably positioned such that at least about 50 area % of internal and external surface of at least about 50% of total number of bodies 18 is adjacent to a region 20 and in contact with the fluid feed stream flowing through regions 20. In the more preferred embodiments of the invention, bodies 18 and regions 20 are positioned such that at least about 60 area % of internal and external surfaces of at least about 60% of total number of bodies 18 is adjacent to an open region 20 and in contact with the fluid feed stream flowing through open region 20, and in the most preferred embodiments of the invention bodies 18 and open regions 20 are positioned such that at least about 80 area % of internal and external surfaces of at least about 80% of the total number of bodies 18 is adjacent to an open region 20 and in contact with the fluid feed stream flowing through said open region 24. In the embodiments of choice, bodies 18 and open regions 20 are distributed in biomass 16 in a homogeneous or substantially homogeneous fashion.

Biomass 16 comprises an effective amount of open regions 20 dispersed in the biomass. As used herein "an effective amount of open regions 20" is an amount capable of providing any increase in the gas/liquid/solid distribution in biomass 16, and an improvement in bulk removal rate at a residence time of about 13 hours as compared to an analogous biomass of all or substantially all bodies 18. In general, the amount of open regions 20 can be defined in terms of the % volume of the biomass composed of region 20. In the preferred embodiments of the invention, the total % volume of biomass 16 composed of regions 20 is from about 30 to about 90 vol %, the remaining volume percent being all or substantially all bodies 18. In the particularly preferred embodiments of the invention, the total % volume of biomass 16 composed of regions 20 is from about 80 to about 40 vol %, the remaining volume percent being all or substantially all bodies 18. In the most preferred embodiments of the invention, the total % volume of biomass 16 composed of regions 20 is from about 50 to about 70 vol %, the remaining volume percent being predominantly bodies 18.

The structure and composition of structure 22 may vary widely provided that structure 22 provides the desired results in enhanced bioremediation, and/or resistance to upset or surges in concentration levels in the influent therein. The only requirement is that the material is suitable for use as a substrate in a bioreactor, and is suitable for use in microbial processes. For example, structures 22 may be formed from organic materials or inorganic materials. Illustrative of useful inorganic materials for fabrication of structures 22 are ceramics such as bentonite, kaolinite, kieselguhr, diatomaceous earth, aluminum, silica, zirconia, barium titanate, synthetic carbides, synthetic nitrides and synthetic borides, glasses such as soda-lime-silica glasses, lead glasses, borosilicate glasses, laser glasses, silica glasses, and glass-ceramics and the like. Suitable organic materials for fabrication of structures 22 are polymers such as polyamides, polyesters, polyester carbonates, polycarbonates, polyolefins and the like. Preferably, structures 22 are molded of a rigid plastic such as polypropylene or polyethylene.

The shape of structure 22 may vary widely, the only requirement is that such structure include sufficient open space so that when in the reactor in operation structure 22 comprises predominantly passages 26. Structure 22 used in the practice of this invention is in particulate form. As used herein, "in particulate form" merely means that the size of structure 22 is less than that of the reactor selected from use such that the relative size of structure 22 and reactor is such that the reactor may contain a plurality of structure 22. The size and shape of structure 22 can vary widely in longitudinal dimension of length and traverse dimensions of thickness, width and diameter. For example, structure 22 may be in particulate form of regular shape such as cubular, rod shaped, rectangular, spherical, hexagonal or the like, or may be of irregular shape. The particle size (length, thickness, width and diameter for regular shaped structures 22 and equivalent diameter for irregular shaped structure 22) may vary widely and is not critical and depends on the reactor size. Particle size is preferably from about 0.10 in. to about 12 in. More preferred particle sizes are from about 0.5 in. to about 5 in., and most preferred particle sizes are from about 0.75 in. to about 3 in. with a particle size of from about 1.0 in. to about 2.0 in. being the particle size of choice.

As shown in FIGS. 7 and 8 structures 22 are predominantly passages 26. In general, passages 26 comprises at least about 40 volume % of the total volume of structures 22. Passages 26 preferably comprises at least about 60 volume % of the total volume of structure 22, more preferably at least about 80 volume % of the total volume of structure 22 and most preferably at least about 95% of the total volume of structure 22. Preferred structures 22 are depicted in FIGS. 7 and 8. As shown in these figures, preferred structures 22 consist of rigid spherical oval or substantially oval or spherical bodies defined by plural ribs, fins, conduits and other structural elements 24 skeletally comprising each spherical body and having a plurality of cavities and passages there through forming passages 26. As also depicted in the figures, open passages 26 are positioned in structure 22 such that passages 26 are adjacent to bodies 18 and the cavities and passages forming open passages 26 allow relatively high liquid and gas flow rates without substantial back pressure and enhanced mass distribution in passages 26 and contact between the fluid stream flowing through passages 26 and the surfaces of adjacent bodies 18.

Bodies 18 used in the practice of this invention are also particulate form. As used herein, "in particulate form" merely means that the size of bodies 18 is less than of reactor 10 selected from use such that the relative size of bodies 18 and reactor 10 is such that the reactor may contain a plurality of bodies 18. The size and shape of bodies 18 can vary widely in longitudinal dimension of length and traverse dimensions of thickness, width and diameter. For example, bodies 18 may be in particulate form of regular shape such as cubular, rod shaped, rectangular, spherical, hexagonal or the like, or may be or irregular shape. The particle size (length, thickness, width and diameter for regular shaped bodies 18 and equivalent diameter for irregular shaped bodies 18) may vary widely and is not critical and depends on the reactor size. Particle size is preferably from about 0.10 in. to about 12 in. More preferred particle sizes are from about 0.5 in. to about 5 in., and most preferred particle sizes are from about 0.75 in. to about 3 in. with a particles size of from about 1.0 in. to about 2.0 in. being the particle size of choice.

One critical requirement for bodies 18 is that the internal and external surface area to volume ratio of bodies 18 is greater than that of open regions 20. The greater the difference in the ratio, the more effective the process and the less the difference the less effective the process. In the embodiments of this invention of choice open spaces 20 and bodies 18 are such that the difference in the surface area to volume ratio is as great as possible, while at the same time retaining the required relative positioning and proportions of bodies 18 and regions 20 in biomass 16. The ratio of the internal and external surface area to volume of bodies 18 is preferably at least about 20 times greater than that of regions 20, more preferably at least about 10 times greater of than that of regions 20 and is most preferably at least about 5 times greater than that of regions 20.

Bodies 18 comprises primarily a substrate 28. As depicted in FIGS. 4, 5 and 6 substrate 28 is preferably porous which allows some degree of inflow of the fluid stream into and through bodies 18. In the preferred embodiments of this invention, substrate 28 includes from about 2 to about 60 pores per linear inch. The number of pores per linear inch is more preferably from about 5 to about 30, and most preferably from about 10 to about 20. In the embodiments of choice, the number of pores per linear inch is from about 10 to about 15.

Substrate 28 is preferably resistant to the shear forces and abrasion present in the reactor, and preferably has good crush strength. In these preferred embodiments of the invention, substrate 28 is preferably semiflexible, with a density of under about 2 pounds per cubic foot for optimum economic feasibility. However, higher density substrates, of from about 4 to about 5 pounds per cubic foot or even higher, are usable. It should be realized that substrate density is related to the economics of the invention and not to its performance; the invention may be practiced with a large range of substrate densities, even if certain ranges may present distinct economic advantages.

The amount of substrate 28 included in the biologically active particles 18 may vary widely. In general, the amount of substrate 28 is from about 50 to about 95 weight percent based on that total weight of biologically article particle 18. In the preferred embodiments of the invention, the amount of substrate 28 is from about 60 to about 90 weight percent based on the total weight of particle 18, and in the particularly preferred embodiments is from about 70 to about 85 weight percent on the aforementioned basis.

Substrate 28 is formed from any material capable of forming a body 18 useful materials include inorganic materials and organic plastics. Illustrative of useful materials for fabrication of bodies 18 are synthetic and naturally occurring polymeric materials such as polyamides such as poly(hexamethylene adipamide) (nylon 66), poly(4-aminobutyric acid) (nylon 4), poly(6-aminohexanoic acid) (nylon 6), poly(hexamethylene sebacamide) (nylon 6,10) and the like; polyesters such as poly(ethylene terephthalate), poly(butylene terephthalate), poly(1,4-cyclohexane dimethylene terephthalate) and the like; polyolefins such as polyethylene, polypropylene, poly(4-methyl pentene), polystyrene and the like; polyvinyls such as polyvinyl alcohol, poly(vinyl methyl ether), poly(vinyl methyl ketone), poly(vinyl pyrrolidone) and the like; polyacrylics such as polyacrylic acid, polymethacrylic acid, poly(methyl acrylate) poly(methyl methacrylate) poly acrylonitrile, polyacrylamide, poly(methacrylamide) and the like. Other useful polymeric materials for use in the fabrication of the polymeric substrate are polyurethanes such as those derived from reaction of diisocyanates such as toluene diisocyanates, diphenyl methane diisocyanates, hexamethylene 1,6-diisocyanate, dicyclohexylmethane diisocyanate, 1,5-naphalene diisocyanate, p-phenylene diisocyanate, m-phenylene diisocyanate, 2,4-toluene diisocyanate, 4,4' diphenylmethane diisocyanate, 3,3'-dimethyl-4,4' diphenylmethane diisocyanate, 3,3'-dimethyl-4,4' biphenyl diisocyanate, 4,4'-diphenylisopropylidiene diisocyanate, 3,3'-dimethyl-4,4'-diphenyl diisocyanate, 3,3'-dimethyl-4,4'- diphenylmethane diisocyanate, 3,3'-dimethoxy-4,4'-biphenyl diisocyanate, dianisidine diisocyanate, toluidine diisocyanate, hexamethylene diisocyanate, 4,4'-diisocyananodiphenylmethane and the like and diols such as glycerin, trimethylopropane, 1,2,6-hexane triol, methyl glycoside pentaerythriol, sorbital sucrose, ethylene glycol, diethylene glycol, hydroxy terminated polyesters formed by direct esterification of dicarboxylic acid with an excess of a disfunctional alcohol such as poly(tetramethylene adipate), poly(ethylene adipate), poly(1,4-butylene adipate), poly(1,5-pentylene adipate), poly(1,3 butylene adipate), poly(ethylene succinate), poly(2,3-butylene succinate), polyether diols such as those prepared by reaction of a compound having active hydrogens such as di alcohols, poly alcohols, di phenols, polyphenols, aliphatic diamines or polyamines and aromatic diamines or polyamines with alkylene oxides such as styrene oxide, butylene oxide, propylene oxide, epichlorohydrin or mixtures of these alkylene oxides, ethylene diamine, diethylene triamine and 4,4-phenyl-methane diamine.

In the preferred embodiments of this invention substrate 28 is formed of a flexible, semi-flexible or rigid polymeric foam. The more preferred polymeric substrate material in the present invention is a flexible open-celled foams with a relatively high permeability at least about 60%, preferably at least about 75%, more preferably at least about 85% and most preferably at least about 95% to the fluid contained in the fluid feed stream. The foam used in the practice of this invention must accommodate feed flow in the fixed bed configuration. To this end, it is important that the foam has a relatively highly interconnected porosity where the foam voids desirably are at least about 40 volume % and can range up to about 98 volume %.

The voids preferably are on the order of from about 40 volume % to about 98 % in volume, more preferably from about 60 volume % to about 96 volume % and most preferably from about 85 volume % to about 95 volume %. "Flexible cellular polymeric materials" are usually compressible. As used herein "flexible cellular polymeric material" means a cellular organic polymeric material which will not rupture when a specimen 200 by 25 by 25 mm is bent around at 25 mm diameter mandrel at a uniform rate of one lap in 5 s at a temperature between 18 and 29 deg C. as specified by ASTM Standards D 1565, D 1667, D 3574 and D 3575. Because of their flexibility, bodies 18, when used alone, tend to agglomerate and lose their original form and shape under pressure, which can be generated by the buoyant force when said bodies are immersed in a fluid having a higher density than said bodies, resulting in a decrease in their effective surface to volume ratio and causing a hindrance to the passage of the fluid stream through and around said bodies thereby decreasing the rate of mass transfer and performance. By addition of open spaces 20, agglomeration of flexible bodies 18 is greatly reduced by increasing fluid flow through and around bodies 18 and decreasing the effective buoyant force acting on said bodies, resulting in more effective bioremediation and/or enhanced resistance against upset due to surges in material concentration levels in the feed stream, as compared to a process or reactor using all or substantially all bodies 18.

In the more preferred embodiments of this invention, substrate 28 is formed from open-celled polyurethanes, such as cross-linked polymeric materials which can be foamed with an appropriate foaming agent such as nitrogen, helium, carbon-dioxide, azodicarbonamide and the like, to form open celled foams having the void characteristics described above. In these preferred embodiments of the invention substrate 28 can be prepared and foamed in the presence of the selected microorganism without adversely affecting same.

In the particularly preferred embodiments of the invention, substrate 28 is formed from cross-linked poly- urethane-hydrogels. Such materials can be obtained from commercial sources or prepared in accordance with known techniques. For example, such materials may be obtained by reacting isocyanate prepolymers with water (in which diamines or polyamines are optionally contained as chain lengthening agents), or as cross-linking agents or by reacting a suitable polyol with a suitable diisocyanate or polycyanate reagent. Suitable polyols include long chain aliphatic diols and polyoxyalkylene ethers. The isocyanate prepolymers have isocyanate end-groups and are prepared by reacting poly oxyalkylene ethers with an excess of diisocyanate or polyisocyanates. Illustrative of useful polyoxyalkylene ethers are those which have a molecular weight of from about 500 to about 10,000, preferably from about 2,000 to about 8,000, which have at least two active hydrogens and which contain at least 30% by weight based on the total weight of the polyethers of oxyethylene groups. Other useful oxyalkylene groups include oxypropylene, oxybutylene and the like. Polyethers of this type are produced by reacting compounds which have reactive hydrogen atoms such as dialcohols, polyalcohols, diphenols, polyphenols, aliphatic diamines, aliphatic polyamines, aromatic diamines, or aromatic polyamines with a suitable alkylene oxide such as ethylene oxide, propylene oxide, butylene oxide, styrene oxide and the like. Suitable diisocyanates include toluene 4,4'-diisocyanate, toluene 2,4-diisocyanate, toluene 2,2-diisocyanate, diphenylmethane 4,4'-diisocyanate, diphenylmethane 2,4'-diisocyanate, diphenylmethane 2,2'-diisocyanate, toluene 2,6-diisocyanate, hexamethylene 1,6- diisocyanate and useful diamines and polyamines include aliphalic, cycloaliphatic and aromatic di- and polyamines such as ethylene diamine, hexamethylene diamine, diethylene triamine, hydrazine, guanidine, carbonate, N,N'-diisopropylhexamethylene diamine, 1,3-bisaminomethylbenzene, N,N'-bis-(2-aminopropyl)- ethylene diamine, N,N'-(2-aminoethyl) ethylene diamine, 4,4'-diaminodiphenyl methan, 4,4'-dimethylamino-3,3'-dimethyldiphenyl methane, 2,4'-diamino-diphenylemthane, 2,4-diaminotoluene, 2,6-diaminotoluene and the like.

Biologically active bodies 18 may include various optional ingredients such as a material having cationic groups. Illustrative of such materials are standard ion exchange resins which have cationic groups or other polymers which have structures containing positively-charged nitrogen atoms such as polyaminocarboxylic acid esters having cationic groups, polyacrylamides having cationic groups, polyethylene imines having cationic groups, copolymers of acrylonitrile, styrene and dimethylaminoethyl methacrylate having cationic groups, and condensation products of diethylene triamine and maleic anhydride having cationic groups, copolymers of isobutylene and maleic anhydride, followed by imidization with specific diamines, having cationic groups. The content of polymers having cationic group in the composition according to the invention may vary widely and is usually from about 0.2 to about 20% by weight based on the total weight of the biologically active particle, preferably from about 0.5 to about 15% by weight, and most preferably from about 1 to about 10% by weight, based on the total weight of the reaction mixture for the preparation of the composition. Illustrative of other optional components which can be used in the practice of this invention are density-increasing substances such as barite, metal powder, powdered rubber, clay powder, pumice powder, glass powder, powder obtained from the kernels and shells of olives and nuts, and rock-flour; density-reducing substrates such as small polystyrene globules, wood powder, powder from plastic waste, hollow microbeads, and polyethylene foam flakes; coloring agents such as coloring pigments, and dyes; short fibers of an organic or inorganic base such as glass fibers and gel-forming macromolecular substances such as types of cellulose, alginate, starch, and carrageenan.

As depicted in FIG. 5, in one preferred embodiments of the invention bodies 16 comprises a substrate 28 formed of a material which is an absorbent for one or more of the materials in the fluid feed stream having aerobic or anaerobic microorganisms 30 which are capable of growth and of metabolizing at least one of the materials in the feed stream under process conditions, on, in or on and in substrate 28. For example, in one preferred embodiment of this invention, substrate 28 is formed from a "hydrophobic polyurethanes", which are absorbent for organic materials such as phenol. As used herein, "hydrophobic polyurethanes" are family of polymers containing repeat urethane groups of the formula:

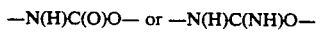
—N(H)C(O)O— or —N(H)C(NH)O— preferably of the formula:

—N(H)C(O)O—

Hydrophobic polyurethane are those which cannot be wetted by water. That is, a droplet of water on the surface of the polyurethane has an angle of contact of greater than 0° and preferably greater than 90° as measured by a goniometer. In the preferred embodiments of the invention, hydrophobic polyurethane are those in which the molar ratio of carbon and hydrogen atoms to oxygen and nitrogen atoms in the polymeric backbone is greater than 1.4. The upper level of hydrophobicity of the polyurethane is not critical and in general hydrophobic polyurethanes having higher hydrophobicity are preferred. In the preferred embodiments of this, the hydrophobic polyurethanes are selected such that the molar ratio of carbon and hydrogen atoms to oxygen and nitrogen atoms in equal to or greater than about 2.0, and in the more preferred embodiments of this invention the ratio of carbon and hydrogen atoms to oxygen and nitrogen atoms in equal to or greater than about 2.5. Amongst the more preferred embodiments of this invention, most preferred are those embodiments in which the molar ratio of carbon and hydrogen atoms to oxygen and nitrogen atoms is equal to or greater than about 3.0.

Illustrative of useful hydrophobic polyurethane are those described above in which molar quantities of polyisocyanate and polyol reactants have bee adjusted to provide the desired hydrophobicity. The adsorption and/or absorption of materials in the fluid feed stream, such as substituted and unsubstituted phenol, onto and into the polyurethane foam can be affected by both the type of polyol used as well as the portion of cross-linked isocyanate compounds present in the foam. In the preferred embodiments of the invention, aromatic isocyanates and/or polyols having a larger ratio of carbon and hydrogen to oxygen such as polyols such as those polyols which contain increased carbon atoms such as poly(propylene ether) glycol and other polyols having pendant aliphatic groups. In the most preferred embodiments, it is preferred to increase the amount of aromatic groups, specifically aromatic isocyanate compounds, in the hydrophobic polyurethane foam in order to enhance the hydrophobic characteristic of the polymer. Preferably, the hydrophobic moieties derived from one or more types of polyurethane contains more than about 15% by weight of an aromatic isocyanate and less than about 85% by weight of a moiety derived from one or more types of a poly(alkylene ether) glycol wherein at least about 40% by weight of the diol derived moieties are derived from such glycols where the alkylene repeat units include more than three carbon atoms especially poly(propylene oxide). Among these preferred embodiments of the invention, more preferred are those embodiments in which the hydrophobic polymer has at least 50% by weight of poly (alkylene ether) glycol and more than about 20% by weight of aromatic isocyanate. In particular preferred embodiments, the polyol content of hydrophobic polyurethane is at least 80% by weight of which less than about 60% by weight is polyethylene ether glycol, and less than about 25% by weight of aromatic isocyanate. In the more particularly preferred embodiments of invention, the polyol content is greater than about 70% by weight polyethylene oxide and less than about 30% by weight of aromatic isocyanate.

As depicted in FIGS. 4 and 6, in another preferred embodiment of this invention biologically active bodies 18 comprise a substrate 28 having a particulate absorbent 32 for at least one of the pollutants contained in the aqueous feed stream on the surface of substrate 28 and having aerobic or anaerobic microorganisms 30 (which are capable of growth and of metabolizing at least one of the materials in the fee stream under process conditions) on, in or on and in substrate 28 and/or absorbent 32. In the preferred embodiments of the invention, absorbent 32 is on the surface of substrate 28 and microorganism 30 are on, and on and in the substrate 28 and on absorbent 32.

Absorbent 32 for use in the practice of this invention may vary widely. The only requirement is that absorbent 32 is capable of absorbing the target pollutant on its surface and is capable of binding or being bound to the substrate surface by a number of mechanisms such as surface compatibility, charge and by a binding polymer such as polypropylene (See U.S. Pat. No. 4,089,609, col. 4, lines 14 to 30).

Illustrative of useful materials for use in the fabrication of absorbent 32 are carbons such as coal, carbon black, activated carbon, and activated charcoal, silica gel, active clays, zeolites, hydrophobic and ion exchange resins, molecular sieves, and the like. In the preferred embodiments of the invention, absorbent 32 is formed from carbons such as coal, charcoal, carbon black and activated carbon, and in the particularly preferred embodiments of the invention, the particulate absorbent 32 is formed from activated carbon. However, it will be clear to a person skilled in the art that any other particulate material can be used to form absorbent 32 may be used. The activated carbon which is preferably used may be produced by heat treatment of vegetable matter, animal matter, coal, lignite, petroleum residues or synthetic organic polymers either with o without the addition of chemicals, and is characterized by rapid and effective absorption of the targeted pollutants.

Absorbent 32 is in particulate form and is preferably porous to provide for greater surface area. The preferred particulate absorbent 20 has a surface area at least about 500 m$^2$/g, preferably at least about 700 m$^2$/g, and is preferably of a size such that at least about 70% of the absorbent particles are smaller than about 44 microns. That is, a minimum of about 70% of the absorbent particles pass through a 325 mesh sieve. In the preferred embodiments of the invention, powdered absorbent 32 has as high a pore volume as is practical, more preferably at least about 0.5 cm$^3$/g, and most preferably at least about 0.7 cm$^3$/g, with as great a porosity as possible contributed by pores preferably of greater than about 1 micron in size. Maximization of the macropores maximizes the concentration of microorganisms in the immediate proximity of the surface of absorbent 32. Powdered absorbent 32 used in the practice of the preferred embodiments of this invention have a surface area of from about 700 to about 2000 m$^3$/g, a pore volume of from about 0.7 to about 1.0 cm$^3$/g, with from about 70 to about 100% of the particles being under 44 microns in size. Although these correspond to characteristics of commercially available material, the invention per se imposes no such limitations and materials having as high a surface area as possible are the materials of choice.

The amount of absorbent 20 employed may vary widely and depends on a number of factors including the specific activity of absorbent 20 for the target pollutant. In the preferred embodiments of the invention, the amount of absorbent 32 is an amount which is at least sufficient to maintain a steady state of an amount of the target pollutant which will allow the microorganism to metabolize the pollutant in the required time period to provide an effluent stream having less than about 22 ppm of the target pollutants. In the more preferred embodiments of the invention, the amount of absorbent 32 is from about 5 weight percent to about 85 weight percent on a dry basis and based on the total weight of substrate 18 and absorbent 20. In the particularly preferred embodiments of the invention, the amount of absorbent 20 is from about 10% by weight to about 50 weight percent on a dry basis and based in the total weight of substrate 18 and absorbent 20, and in the most preferred embodiments of the invention, the amount of absorbent 20 is from about 20% by weight to about 40% by weight on the aforementioned basis.

Microorganisms 30 used in the practice of this invention are anaerobic or aerobic microorganisms selected to degrade target materials in the fluid stream in ways well known in the art. The microorganisms can be employed as a pure strain or as a consortium of microorganisms. Although anaerobic microorganisms often degrade pollutant materials at a slower rate than aerobic microorganism, an anaerobic process may be required to degrade a pollutant or an intermediate product of an aerobic process to an nontoxic level or to a non pollutant material. Useful microorganisms 30 may vary widely and may be naturally occurring microorganisms 30 or may be genetically engineered microorganisms 30. The only requirement is that microorganisms 30 are capable of metabolizing the target pollutant(s) to the required effluent levels over the required period of time. In the preferred embodiments of the invention, microorganism 30 are obtained from the pollutant-containing waste stream or from soil which has been in contact with the waste stream.

In the process, a fluids stream, as for example a aqueous feed fluid stream, containing one or more biodegradabl materials is introduced into reactor 10 via inlet 12, passes through reactor 10 and exits the reactor via exit 14 at a rate sufficient to reduce the concentration of at least one of the materials in the effluent stream to the desired levels. The process of this invention can be conducted under aerobic or anaerobic conditions. In the preferred embodiments of the invention where aerobic microbes are employed, the process is carried out under aerobic conditions in which the process is carried out in the presence of a gas comprising an effective amount of oxygen. In these preferred embodiment, it is important that reactor 10 be oxygenated to provide the necessary amount of oxygen for proper microbial metabolism and pollutant degradation. The amount of oxygen required in any situation will vary widely and will depend to a significant extent on the requirements of the particular microorganism(s) employed in the process and other factors known to those of skill in the art. In general, the amount of oxygen distributed in the process feed stream is at least about 2 mg of oxygen per liter of aqueous feed. In the preferred embodiments of the invention, the amount of oxygen is from about 5 mg per liter of feed to about 10 mg per liter of feed and in the most preferred embodiments of the invention, the amount of the oxygen is from about 6 mg/liter of feed to about 8 mg/liter of feed. In the preferred embodiments of this invention, the gas is distributed uniformly o substantially uniformly throughout all or a portion of the biologically active biomass. The manner in which the gas is introduced into reactor 10 may vary widely. The gas may be introduced into reactor 10 employing conventional methods. For example, in the vertical or up-flow reactor 10 of FIG. 1, the gas is introduced into reactor 10 with the aqueous feed stream at the bottom of the reactor 10 through use of diffuser 38 which introduces the gas in the form of small diameter gas bubbles. Supplemental gas can be introduced, if required, at various points along the vertical length of reactor 10 (not depicted in the drawing). In the embodiment of the invention in which reactor 10 is a horizontal reactor as for example the reactor of FIG. 2, the gas can be introduced along the horizontal length of reactor 10 at various points to achieve a substantially uniform distribution of the gas in the feed stream in reactor 10. In this embodiment, the up-flow of the gas is orthogonal or substantially orthogonal to the direction of the flow of the aqueous feed stream. In the most preferred embodiments of the invention, reactor 10 is in a horizontal configuration in which the gas is distributed uniformly or substantially uniformly throughout all or substantially of reactor 10. In these most preferred embodiments, the gas is introduced into reactor 10 along the horizontal length of reactor 10 as depicted in FIG. 2. In this mode, a more uniform distribution of the gas in the feed stream is achieved.

Process temperatures may vary widely and will depend on the particular microorganisms chosen for use. In general, the process is carried out at a temperature sufficiently high so as to not unduly interfere with the metabolism of the microorganism and sufficiently low as to not kill the microorganism. Process temperatures are usually from about 5° C. to about 65° C. Process temperatures are preferably in the range of from about 15° C. to about 65° C., more preferably in the range of from about 20° C. to about 40° C. and most preferably in the range of from about 25° C. to about 35° C.

The fluid stream is treated in the process of this for a time sufficient to reduce concentration levels of at least one of the material in the effluent stream the desired extent. In general, with fluid feed streams in which the concentration levels of at least one material is equal to or less than about 12,000 (ppm) (preferably equal to or less than about 6,000 ppm, more preferably equal to or less than about 3,000 ppm, more preferably equal to or less than about 2,000 ppm) a residence time equal to or less than about 200 hours, preferably equals or less than about 100 hours, more preferably equal to or less than about 25 hours and most preferably equal to or less than about 13 hours, suffices to attain a concentration for at least one pollutant in the effluent stream to equal to or less than about 100 parts per million (ppm), preferably equal to or less than about 10 ppm, more preferably equal to or less than about 1 ppm most preferably equal to or less than about 0.1 ppm. With an effluent concentration of equal to or less than about 0.02 ppm is the concentration of choice. The particular residence time depends upon the amount and type of organic materials in the feedstock, operating temperature, the presence of other materials in the feedstock, the density of microorganisms in the and so forth.

The process of this invention preferably results in resistance to "upset". As shown herein "upset" is a surge in concentration levels of material in the feed stream. Resistance to upset is that when such surges or upset occurs, variations in concentration levels of the material in the effluent stream are minimum. When the concentration of a pollutant in the influent stream is increased by a certain increment for a period of one hydraulic residence time (HRT) preferably the concentration of said pollutant in the effluent stream preferably increases by an amount less than or equal to about 25% of the said increment, more preferably increases by an amount less than or equal to about 10% of the said increment, and most preferably increases by an amount less than or equal to about 1% of the said increment within about one HRT or less.

The fluid streams which may be treated in the process of this invention may vary widely. For example, such streams may be gaseous streams containing one or more materials or may be liquid streams. In the preferred embodiments of this invention the fluid stream or aqueous streams containing one or more materials dissolved or suspended therein. The pollutants contained in such streams may vary widely. The only requirement is that at least one of the materials can be degraded or metabolized by an aerobic or anaerobic microorganism. For example, the materials may be inorganic nitrogen compounds such as ammonia and nitrates. The materials may also be organic materials. Illustrative of such organic pollutants are phenolic materials such as phenol, the cresols, resorcinols, catechol, halogenated phenols as for example, 2-chlorophenol, 3-chlorophenol, 4-chlorophenol, 2,4-dichlorophenol, pentachlorophenol, nitrophenols as 2-nitrophenol and 4-nitrophenol and 2,4-dimethylphenol. Another important class of organic pollutants consists of aromatic hydrocarbons, such as benzene, toluene, xylenes, ethylbenzene, and so forth. Polynuclear aromatic hydrocarbons are an important subclass as represented by naphthalene, anthracene, chrysene, acenaphthylene, acenaphthene, phenanthrene, fluorene, fluoranthene, naphthacene, and pyrene. Still other materials are halogenated alkanes such as trichloroethane and the like.

In the preferred embodiments of this invention the materials are those which are common in waste streams from industrial manufacturing facilities. For example, various substituted and unsubstituted phenols such as phenol, chlorophenols and nitro-phenols, and aromatics such as benzene are preferred pollutants for treatment in the process of this invention, and substituted and unsubstituted phenols, especially phenol, are the most preferred pollutants. Phenol is found in waste streams of phenol manufacturers, of phenol users as phenol resin producers, of coal tar processing facilities, of wood pulping plants and other facilities practicing delignification. This is not to say that the process can or must be practiced only on such streams. The process which is the invention herein may be practiced on any feed containing levels of one or more materials which are to be reduced.

The initial concentration of materials contained in the aqueous waste stream used in the process of this invention may vary widely. One of the advantages of this invention relative to prior art bioremediation processes is that fluid streams containing relatively high amounts of materials to be removed or reduced in concentration can be treated. The concentration of materials to be removed or reduced in concentration in process streams treatable in the process of this invention are "biologically treatable levels". As used herein, "biologically treatable levels" are materials to be removed or reduced in concentration which do not inhibit or excessively inhibit the metabolism of the pollutants by the microorganism. Effluent streams from industrial processes such as phenol manufacturing plants and coal tar processing plants may have materials to be removed or reduced in concentration levels in excess of 20,000 ppm which may interfere with the process. It is preferred to reduce these levels to biologically treatable levels through use of conventional procedures such as solvent extraction, steam distillation and the like. In general, the concentration of materials to be removed or reduced in concentration in the fluid streams (preferably aqueous streams) is equal to or less than about 12,000 ppm. Obviously, the lower concentration is not critical and does not represent a limitation on the process. In the preferred embodiments of this invention, the concentration of materials to be removed or reduced in concentration is equal to or less than about 6,000 ppm, and in the particularly preferred embodiments of the invention the concentration of materials to be removed or reduced in concentration is equal to or less than about 3000 ppm. Amongst these particularly preferred embodiments of the invention, most preferred are those in which the concentration of materials to be removed or reduced in concentration is equal to or less than about 2000 ppm with a material concentration of equal to or less than about 1000 ppm being the concentration level of choice.

The pH of the pollutant-containing feed may need to be adjusted for optimum biodegradation. In general, the pH is within the pH rang allowing metabolism of the target pollutant(s). In the preferred embodiments of the invention, the pH of the feed is from about 6 to about 9, and in the most preferred embodiment of the invention, the pH of the feed is from about 6.5 to about 7.5.

Nutrients may need to be provided. Such materials may be added through use of known additives such as fish meal peptine, soybean flour, peanut oil, cotton seed oil, and usually salts capable of providing phosphate, sodium, potassium, ammonium, calcium, sulfate, chloride, bromide, nitrate, carbonate or like ions. Usually sufficient amounts often are present in the aqueous feed to satisfy minimum requirements of the microorganism.

The aqueous feed stream is introduced into reactor 10 employing conventional means and is passed through the reactor employing an "effective hydraulic retention time". As used herein, an "effective hydraulic retention time" is a time which is sufficient for the process to reduce the concentration of pollutant in the effluent stream to the desired levels. Hydraulic retention times may vary widely and in general depend on such factors as the concentration pollutants in the aqueous feed stream, desired maximum concentration of pollutants in the aqueous effluent stream, the microorganisms contained in the biomass, the pollutant, and the like. An advantage of the process of this invention is that reductions in pollutant concentration can be obtained with relatively short hydraulic retention times. In the preferred embodiments of this invention, hydraulic retention times are equal to or less than about 72 hrs, and in the particularly preferred embodiments of the invention such times are from about 1 to about 48 hrs. Amongst these particularly preferred embodiments of the invention, most preferred are those embodiments in which the hydraulic retention time is from about 2 to about 24 hrs.

The effluent stream has reduced materials concentration and contains no or substantially no sludge. Such effluent stream can be disposed in compliance with EPA regulations. Alternatively, the effluent stream can be treated to remove any sludge that may be present, as for example, through use of a clarifier and may be recycled for internal use in the process that produced the effluent stream or for other purposes as for example in cooling towers, boilers for steam generation, heat exchangers, scrubbers, reactors and the like.

The following examples are merely illustrative and representative of our invention which is of considerably larger scope. These examples should not be considered limiting in any way.

EXAMPLE I

A series of experiments were carried out to evaluate the effect of spacers on the rate of mass transfer and eventually on the rate of degradation in a Porous Biomass Support System (e.g., Poly Urethane Foam).

Rigid open spheres (plastic) were obtained from Jaeger Products, Inc., under a trade designation of Tripack. These spheres were used as Spacers in the mass transfer experiments. Two different kinds of porous polyurethane foam (PUF) were purchased from two separate PUF manufacturers. A hydrophobic polyurethane foam (PUF-1) was obtained from General Foam, under a trade designation of 1300 series, with a high degree of cross-linking, a polyol content of less than about 80% by weight (50% by weight ethylene oxide and 50% by weight propylene oxide) or less and a toluene diisocyanate content of approx. materials 25% to 35% by weight. This foam had approximately 60 pores per inch. Another hydrophobic polyurethane foam (PUF-2) was obtained from Foamex, Inc., under a trade designation of SIF II, which had a polyol content of 75% by weight (approximately 40% by weight ethylene oxide and 60% by weight propylene oxide) and a toluene diisocyanate content of approximately 25 to 35% by weight of reactants. PUF-2 had 15-20 pores per inch of varying sizes.

PUF and Spacers were mixed together in different proportions in order to achieve a certain amount of openness in the system.

The objective of this experiment was to determine the different rates of mass transfer into water with a mixed media and an all-foam system. In case of a submerged packed bed reactor, it is important to have a good distribution and dispersion of air and liquid in the bed so that whenever oxygen is depleted by microbial consumption it can be replenished immediately with a fresh supply of air. Similarly, the food for microbial growth i.e., the biodegradable pollutants, should be supplied to all available microorganisms by liquid transport. That is why it is absolutely important to construct a biomass support structure that would increase distribution and dispersion of both air and liquid throughout the packed bed, thereby increasing the rate of mass transfer.

Figure 9:
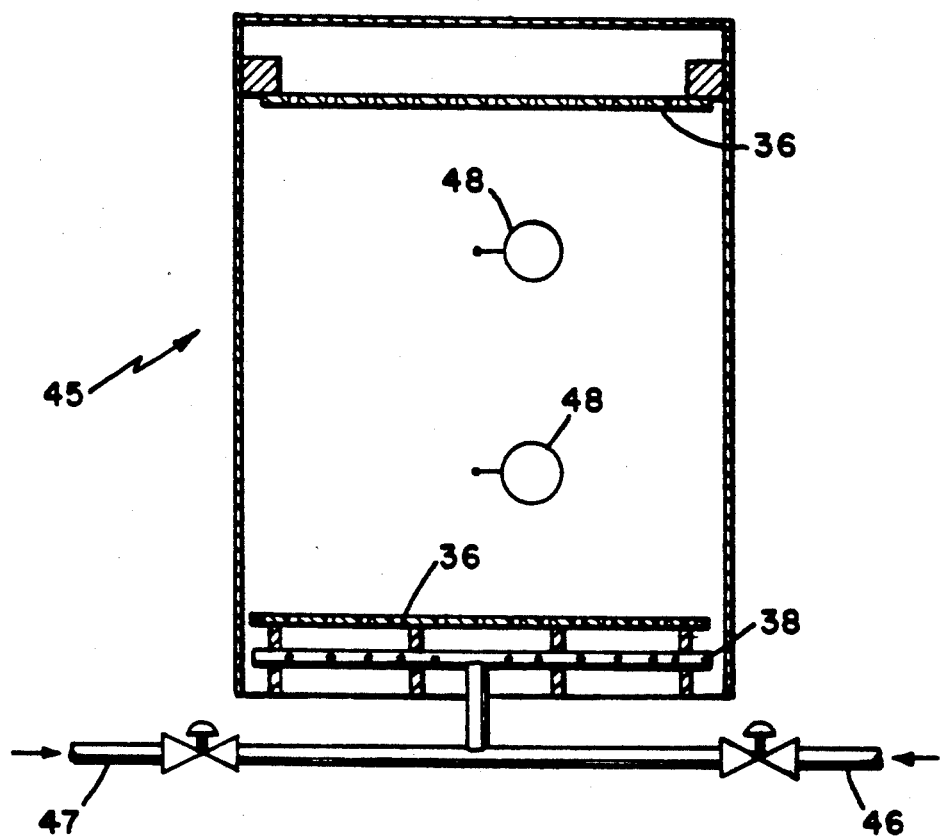
FIG. 9 is a schematic of the experimental system employed in Example I.

FIG. 9 explains the experimental setup. One 55 gallon Nalgene tank (45) was used as a fixed bed reactor for this experiment. This reactor consisted of a total capacity of 55 gallon, a height of 36 inch and 22 inch internal diameter. The reactor volume occupied by packing was approximately 45 gallon. The height of the packed bed was 26 inch. Plastic spacers and foam blocks were retained between two perforated plexiglass discs (36), each having a diameter of 20 inch. Underneath the bottom supporting plate, coarse bubble diffusers (38) were placed so that air (46) or nitrogen (47) could be passed through the bed as required. This reactor was filled up with different mixtures of PUF and spacers and an aeration experiment was conducted with each packing configuration.

The following is a list of packing configurations which were tested in this experiment:
1. Water Only (i.e., without any packing)
2. Tripack Only (i.e., only Tripack was used)
3. PUF-1Only (i.e., only PUF-1 was used)
4. Mixed PUF-1 (i.e., PUF-1: Tripack was 1:1)
5. PUF-2 Only (i.e., only PUF-2 was used)
6. Mixed PUF-2 (i.e., PUF-2: Tripack was 1:1)

The size of Tripack was 2" in diameter, while the PUF blocks were 2" cubes. In the mixed media system PUF and Tripack were mixed randomly in a 1:1 ratio.

During each run, the 55 gallon reactor was initially filled up with fresh tap water. Two YSI dissolved oxygen probes were placed in the packed bed, one foot apart from each other as shown in FIG. 9 (48), and an average of their readings were collected. The saturated dissolved oxygen (DO) level in this water was 9.6 mg/l at 17.2 deg C. In order to obtain the rate of oxygen transfer into the water, the bed was deaerated and aerated successively. The change in DO level was measured during the aeration cycle for each case.

The following is a description of a complete run with one particular packing configuration. First, the water bed was deaerated completely i.e., the DO level was reduced to 0.1 mg/l by bubbling pure nitrogen gas through it. Then air was turned on, 2.0 scfm, and the change in DO level in water was noted. When DO level reached its saturation level at that temperature, aeration was turned off. After this first cycle, nitrogen gas was turned on again to deaerate the bed. After this second deaeration cycle, the bed was aerated at a higher flow rate of 3.5 scfm. This cycle of deaeration and aeration was performed with all the packed beds at two different air flow rates. At the end of each run, the reactor was unloaded and filled up with another set of packings.

FIG. 10 through FIG. 15 show rate of oxygen transfer from air to water. 100% DO level stands for the saturation DO level in water, which was 9.6 mg/l, at that temperature of 17.2 deg C. and pressure of atm. The air flow rates for the experiments corresponding to FIGS. 10-15 were fixed at 2.0 SCFM, and the temperatures were kept at 17.2 deg C. for the FIG. 10 experiment, 18 deg C. for the FIG. 11, 14 and 15 experiments, 17.3 deg C. for the FIG. 12 experiment, and 17.1 deg C. for FIG. 13 experiment. At constant temperature and pressure, this rate of oxygen transfer is a function of mixing and distribution of air and water in the fixed bed.

Table I & II summarize the time taken to reach 50% & 80% saturation DO level for different systems under the same conditions. One can assume that the transfer rate in an empty bed i.e., water without any packing, is the ideal rate of transfer that one can have under any given temperature, pressure and air flow rate.

TABLE I

| | Time Taken to Reach 50% DO Level | |
|---|---|---|
| | Air Flow Rate | |
| Bed Composition | 2.0 scfm | 3.5 scfm |
| 1. Water Only | 4.0 min | 2.8 min |
| 2. Tripack Only | 5.8 min | 3.2 min |
| 3. PUF-1 Only | 11.3 min | 6.0 min |
| 4. Mixed PUF-1 | 4.5 min | 2.5 min |
| 5. PUF-2 Only | 9.0 min | 4.5 min |
| 6. Mixed PUF-2 | 5.8 min | 3.2 min |

TABLE II

| | Time Taken to Reach 80% DO Level | |
|---|---|---|
| | Air Flow Rate | |
| Bed Composition | 2.0 scfm | 3.5 scfm |
| 1. Water Only | 9.2 min | 6.3 min |
| 2. Tripack Only | 15.0 min | 9.0 min |
| 3. PUF-1 Only | 42.0 min | 24.0 min |
| 4. Mixed PUF-1 | 15.0 min | 6.0 min |
| 5. PUF-2 Only | 30.0 min | 12.0 min |
| 6. Mixed PUF-2 | 15.0 min | 9.0 min |

Table I & II show that 50% and 80% DO levels in the water were reached in the mixed media system much quicker than in the all foam system. This clearly proved that the mass transfer rate was always higher in the mixed media system than that in the all-foam systems. This can be explained by the fact that in case of the mixed media system because of its open nature of the bed air mixed with water and stayed in dispersion for a longer period of time. In addition to this, the mixed media system eliminated the problem of compression of the foam bed completely which resulted in better distribution of air and liquid in the packed bed and thereby increasing the rate of mass transfer.

EXAMPLE II

Polyurethane foam is an excellent support for fixed biological growth, but 100% PUF bed suffers from an inherent problem of bed compression under hydraulic pressure. In any application where the height of the PUF bed is more than a few inches, distribution and dispersion of gas & liquid are severely hindered, because the packed bed collapses under hydraulic pressure.

An experiment was carried out with different compositions of mixed-media and PU systems to evaluate the effect of spacers on the compression of the foam bed under hydraulic pressure.

Table III shows the compression of different beds under buoyant pressure.

TABLE III

| Compression of PUF Bed in Water | | | |
|---|---|---|---|
| Bed Composition | Initial Bed Height (in) | Final Bed Height (in) | % Compression |
| 1. Tripack Only | 26 | 26 | — |
| 2. PUF-1 Only | 26 | 20 | 30 |
| 3. Mixed PUF-1 | 26 | 26 | — |
| 4. PUF-2 Only | 26 | 22 | 15 |
| 5. Mixed PUF-2 | 26 | 26 | — |

The spacers (plastic packing) not only contributed to better mixing and distribution of gas and liquid by providing open spaces around the foam cubes, but also added rigidity to the mixed matrix. Since the specific gravity of PUF is less than that of water because of buoyant pressure the entire bed either floats out of water or gets compressed against the top plate, which is generally used to prevent the bed from floating out of water. PUF-2 appeared to be less compressible under hydraulic pressure in a submerged liquid bed. This can be well explained by the macroporosity of PUF-2, which had 15 pores per inch i.e., diameter of each pore was 0.067 inch. Because of larger pores water could flow through PUF-2 which was not the case with PUF-1, which had 60 pores per inch i.e., diameter of each pore was 0.017 inch. PUF-1 acted almost like a solid block of wood while the PUF-2 worked like a fish-net. As a result of this the effective buoyant pressure on PUF-2 was smaller than that acting on the PUF-1. That is why compression of PUF-2 in water was less than that of PUF-1, but compression was still a problem for an all foam bed.

EXAMPLE III

A set of biological experiments were conducted to evaluate the difference in bulk removal efficiencies between an all-foam system and a mixed-media system.

Figure 16:
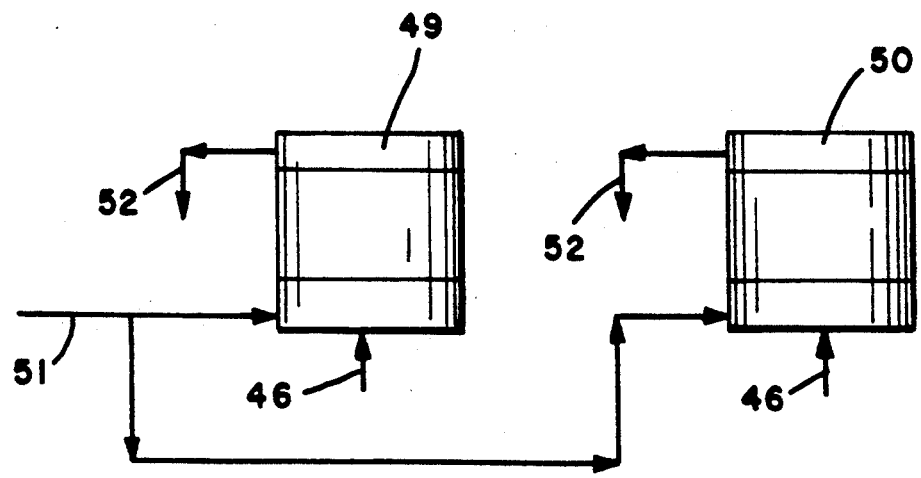
FIG. 16 is a schematic of the experimental system employed in Example II and Example III.
Figure 10:
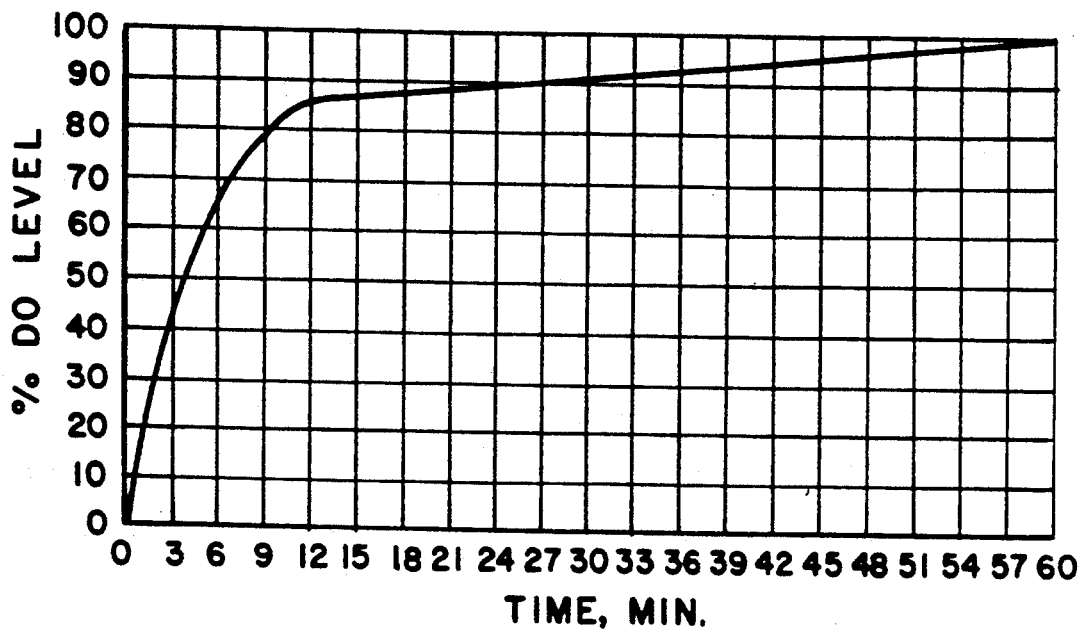
FIG. 10 is a graph of the % of dissolved oxygen in the water (% DO) in a reactor in which there is no bed as a function of time in minute.
Figure 11:
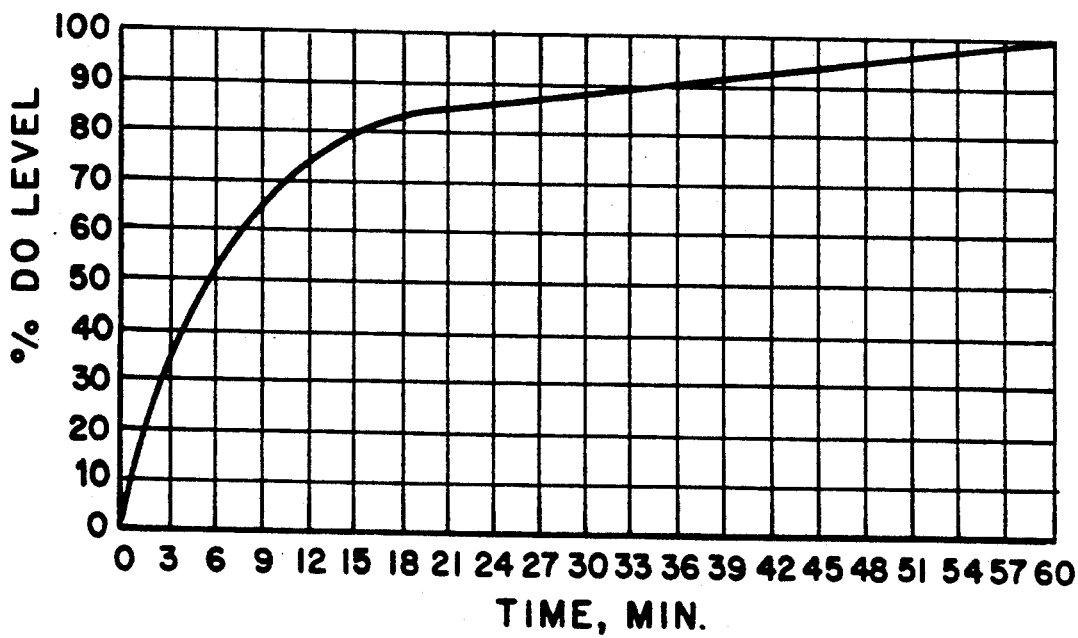
FIG. 11 is a graph of % DO in a reactor containing a fixed bed of 100% tripack (TP) as a function of time in minutes.
Figure 12:
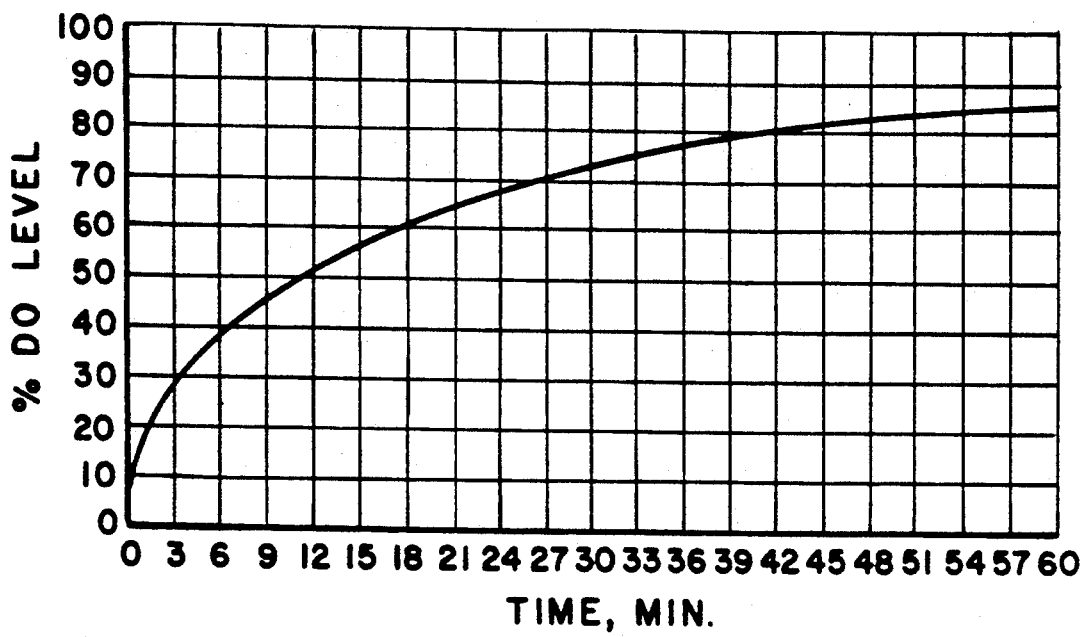
FIG. 12 is a graph of % DO in a reactor containing a fixed bed of 100% polyurethane foam 1 (PUF-1) as a function of time in minutes.
Figure 13:
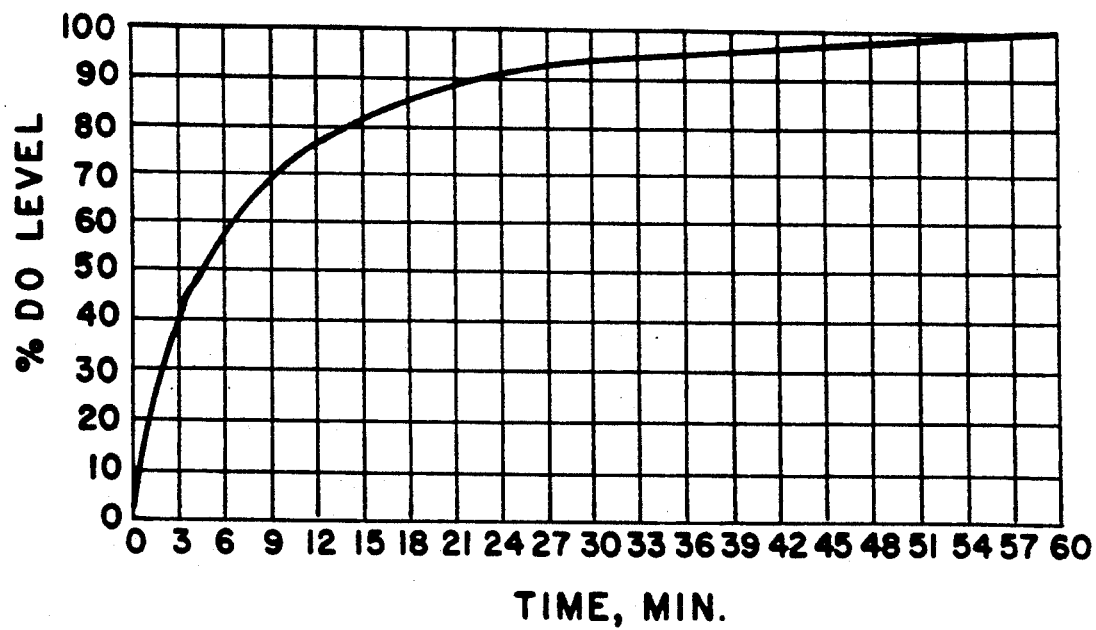
FIG. 13 is a graph of % DO in a reactor containing a fixed bed of PUF-1 and TP at a ratio of 1:1 as a function of time in minutes.
Figure 14:
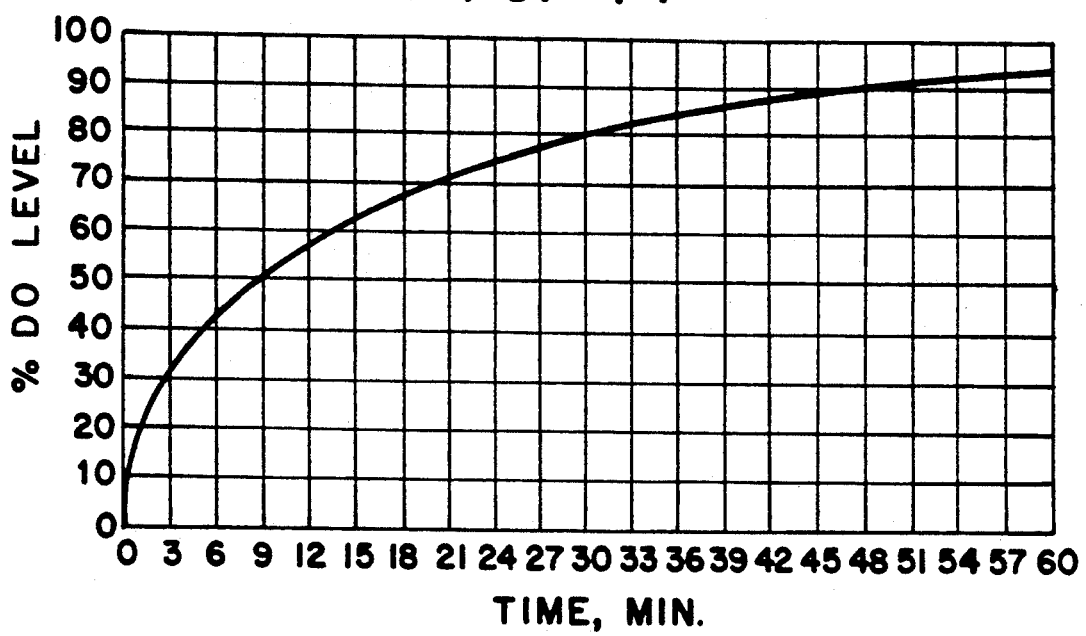
FIG. 14 is a graph of % DO in a reactor containing a fixed bed of 100% polyurethane foam 2 (PUF-2) as a function of time in minutes.
Figure 15:
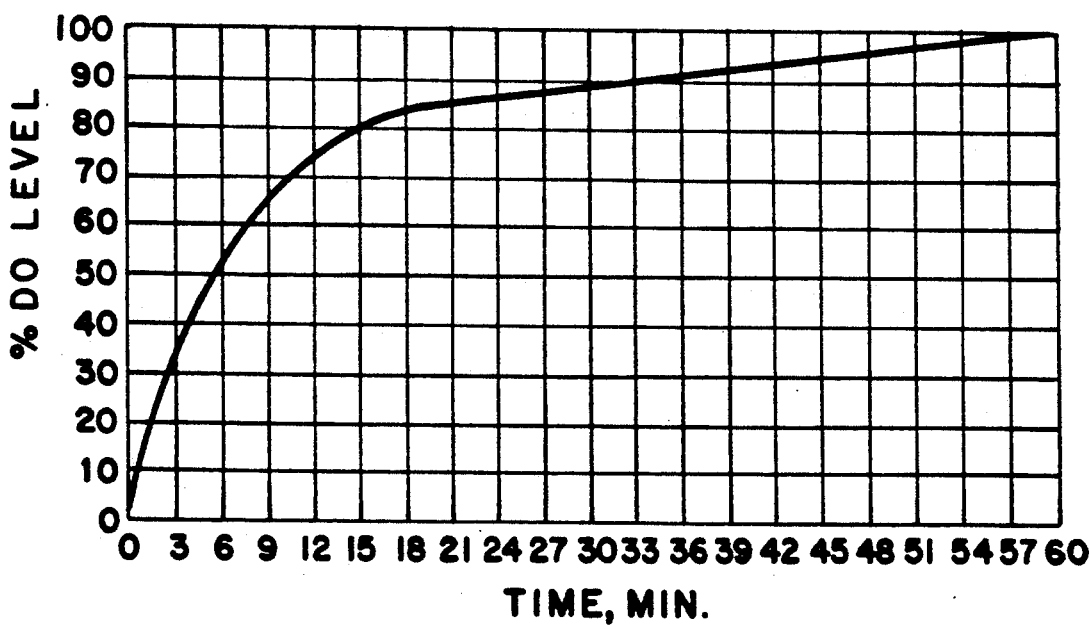
FIG. 15 is a graph of % DO in a reactor containing a fixed bed of PUF-2 and TP at a ratio of 1:1 as a function of time in minutes.

FIG. 16 explains the experimental setup. Two reactors were packed with PUF blocks (49), which were obtained from General Foam, and a mixture of PUF blocks & Tripack (in 1:1 ratio) (50), and used as fixed bed reactors. Each bench scale fixed bed reactor consisted of a plastic tank of approximately 7.5 gallon total capacity. The reactor volume occupied by the packed bed was 6 gallon. Reactors were operated in a cocurrent upflow mode, i.e., both air (46) and waste water (51) flowing from the bottom to the top of the reactor. Compressed air (40 psig) was used to aerate the column through three sintered glass diffuser located at the bottom of the tank. A gas regulator was used to regulate the aeration through the diffusers at a level between 8 l/min and 13 l/min. Same amount of air was supplied to both the systems. Rate of aeration was determined on the basis of stoichiometric requirement for complete phenol degradation and a transfer efficiency (from air to water) of 8% was assumed. Waste water was pumped to the bottom of the tank with a Masterflex peristaltic pump. FIG. 16 shows the process flow of phenol. The feed consisted of an aqueous solution containing 0.1 g/l diammonium phosphate and 0.2 g/l diammonium sulphate, 0.1 g/l magnesium sulphate, 0.05 g/l calcium chloride, 0.01 g/l yeast extract, and 1000 mg/l phenol (approx.).

Since bulk removal of phenol was determined in this experiment, concentration of phenol in the feed and the effluent (52) were analyzed by 4-Aminoantipyrine method only.

The microorganisms selected to degrade phenol were aerobic microorganisms and were isolated from a phenol-containing waste stream by known techniques. To prepare bacterial inoculum adapted to the phenol waste stream, enrichment cultures were set up by adding to the samples of the waste stream 100 mg/l ammonium sulphate and 25 mg/l sodium phosphate followed by adjustment of the pH to 7.0. 100 ml portions of the foregoing sample were dispensed into 250 ml flasks and inoculated with sludge, then incubated at 25 deg C. on a rotary shaker (250 rpm) for 7 days. At this time 1 ml subcultures were dispensed into new wastewater samples and incubated for another 7 days. These isolated microbial cultures were used to inoculate the reactors. A synthetic wastewater was made up to provide a feed concentration of phenol around 1000 ppm.

Figure 17:
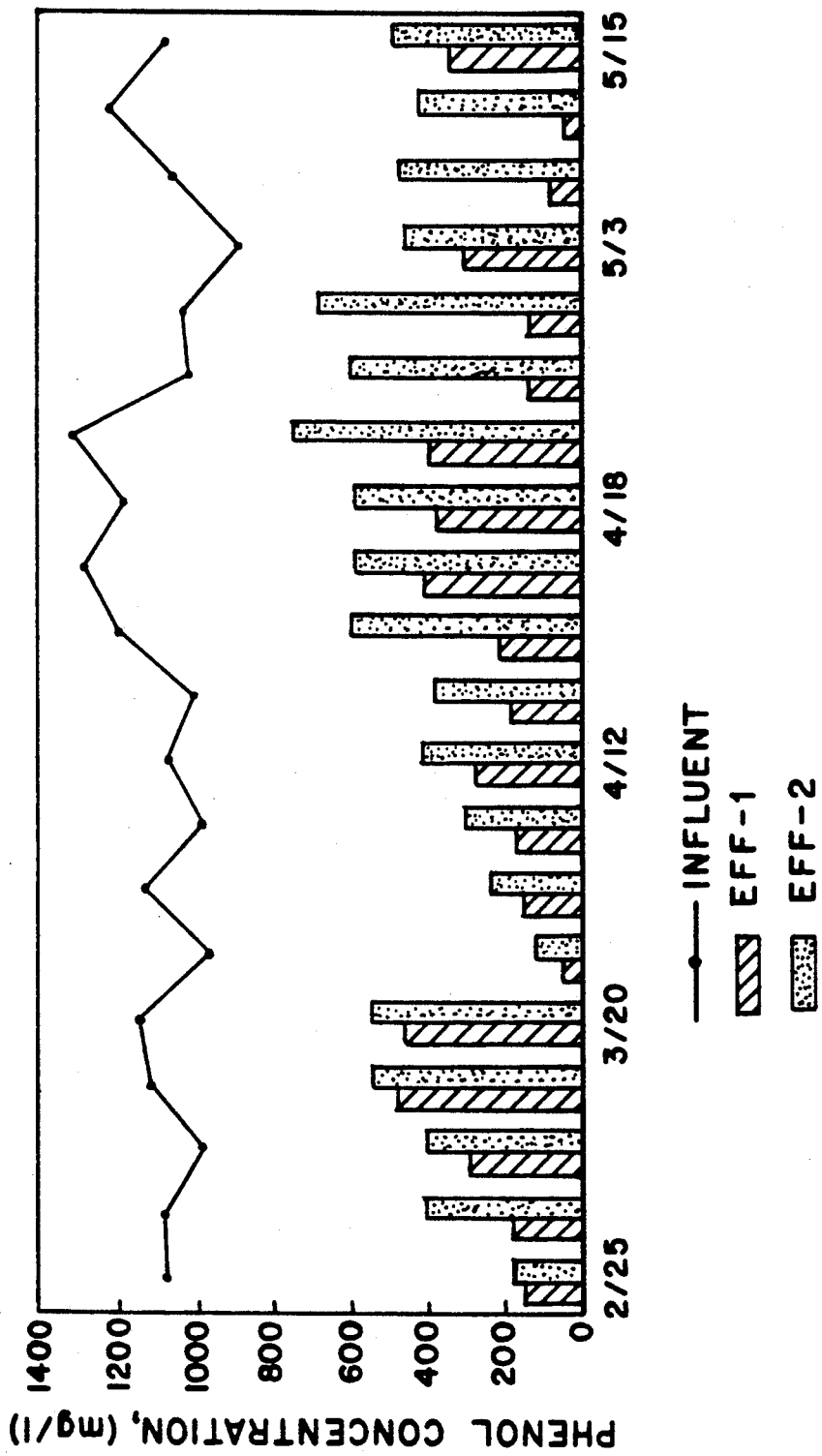
FIG. 17 is a graph of phenol concentration in influent and effluent streams of Example II as a function of time for a mixed fixed bed of 1:1 TP and PUF-1 and for a fixed bed of PUF-1.

Table IV & FIG. 17 show that phenol level in the effluent (EFF-1) from the mixed bed reactor was lower than that (EFF-2) from the all-foam reactor. This trend remained the same during the entire period of experiment. This was clearly because of improved distribution and dispersion of liquid and air in the mixed media system. Channelling of air was observed in case of the all foam system but the mixed media system did not have any channels. This also corroborated the fact that mixed media improved the distribution and dispersion of air-liquid in the bed.

TABLE IV

Bulk Removal of Phenol in Mixed Bed & All Plastic Bed

| Date | HRT (hrs) | Phenol conc. (mg/l) | | |
|---|---|---|---|---|
| | | INF | EFF-1 | EFF-2 |
| FEB 25 | 13.5 | 1073.0 | 141.2 | 175.4 |
| MAR 06 | 12.2 | 1074.5 | 173.3 | 401.4 |
| MAR 07 | 13.9 | 973.2 | 288.4 | 396.4 |
| MAR 19 | 13.9 | 1107.8 | 469.8 | 536.5 |
| MAR 20 | 14.0 | 1137.3 | 453.1 | 538.5 |
| MAR 29 | 14.0 | 959.4 | 44.5 | 112.5 |
| APR 9 | 13.7 | 1128.3 | 145.0 | 230.5 |
| APR 10 | 13.7 | 974.8 | 162.7 | 297.5 |
| APR 12 | 13.9 | 1066.5 | 271.0 | 404.0 |
| APR 15 | 13.9 | 995.9 | 175.6 | 372.6 |
| APR 16 | 13.7 | 1187.8 | 207.7 | 586.2 |
| APR 17 | 13.7 | 1276.5 | 396.3 | 579.8 |
| APR 18 | 13.7 | 1172.7 | 369.6 | 577.3 |
| APR 19 | 14.0 | 1305.0 | 383.6 | 740.4 |
| APR 22 | 13.7 | 1005.0 | 127.8 | 593.3 |
| APR 24 | 13.5 | 1020.5 | 124.0 | 674.0 |
| MAY 3 | 12.4 | 873.3 | 296.9 | 446.0 |
| MAY 8 | 12.4 | 1048.3 | 77.9 | 462.6 |
| MAY 10 | 12.5 | 1206.0 | 34.5 | 410.4 |
| MAY 15 | 12.8 | 1070.5 | 336.0 | 480.0 |
| Average | 13.5 | 1082.8 | 233.9 | 450.8 |

On an average the mixed media system was 50% more efficient at degrading phenol than the all-foam system.

EXAMPLE IV

Another set of biological studies were performed to compare the bulk removal efficiency of an all plastic system to that of a mixed media system.

Using the procedure of Example III, the phenol removal efficiencies for both the systems were determined. Two 7.5 gallon reactors were packed with Tripack, which were obtained from Jaeger Products, and a mixture of PUF blocks, obtained from Foamex, and Tripack. The reactors were inoculated with aerobic microbes following the same method as explained in Example III. A synthetic wastewater containing a phenol at a concentration around 1000 ppm was used as a feed. Since the bulk removal of phenol was determined in this experiment, analysis was done by 4-Aminoantipyrine method only.

Figure 18:
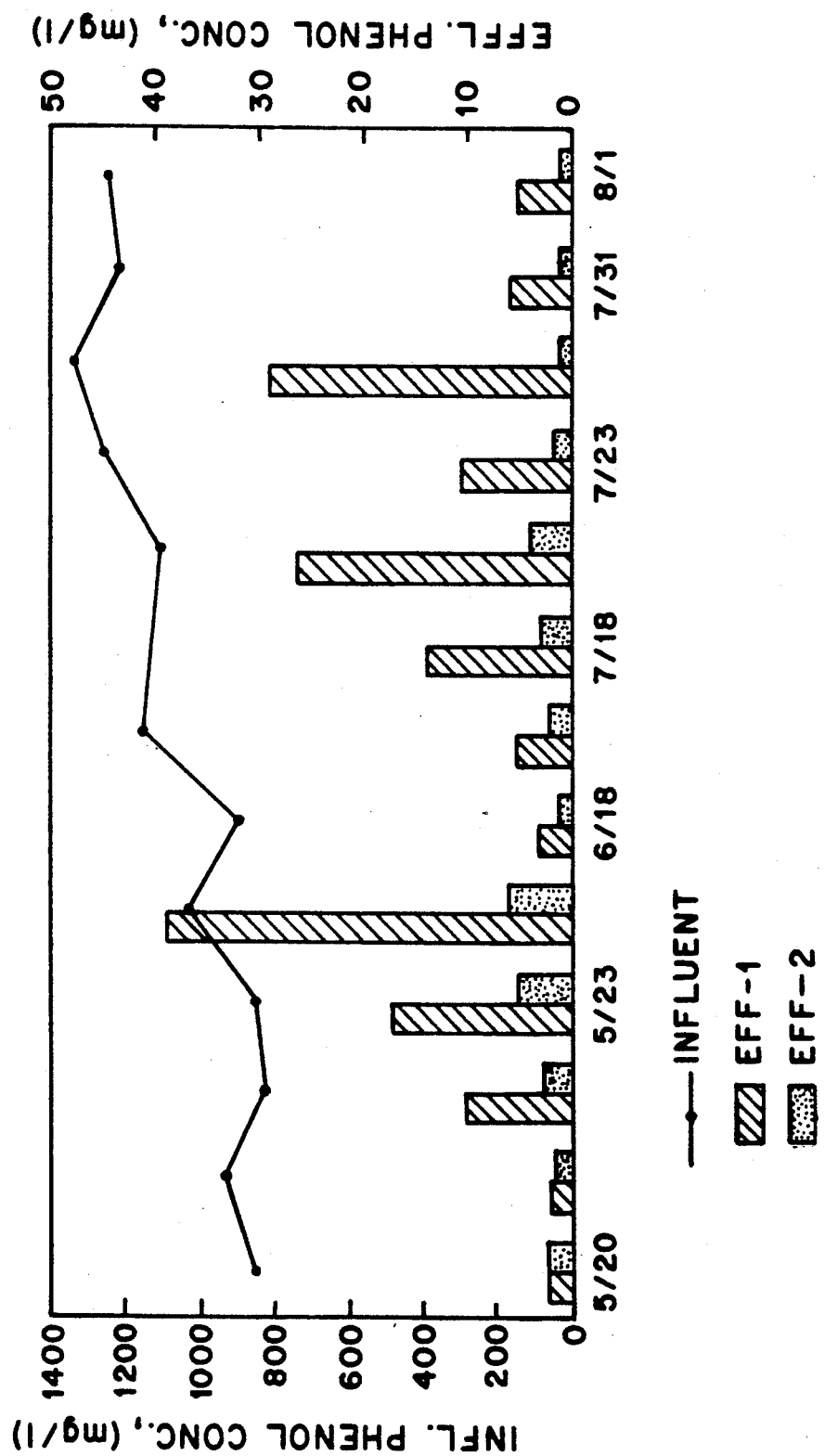
FIG. 18 is a graph of phenol concentration in the influent and effluent streams of Example III as a function of time for a mixed fixed bed of 1:1 TP and PUF-1 and for a fixed bed of TP.

Table V & FIG. 18 show that the phenol concentration in the effluent (EFF-2) from the reactor containing mixed media was consistently lower than that (EFF-1) from the all plastic media. Since accuracy of 4-AAP method can be questioned below 1 ppm phenol concentration, any analytical results below 1 ppm is shown as 1 ppm in Table V & FIG. 17. We can conclude from this study that, as far as bulk removal of organics was concerned, the mixed media system performed at par and in most of the cases even better than the all plastic media system. This is because of the following factors i) the macroporosity contributed by the polyurethane foam, which provided high surface areas for biological growth and ii) openness and rigidity from the plastic spacers, which increased the gas-liquid distribution. So when this mixed media system is coupled with an adsorbent it can definitely outperform any other fixed film system by bringing down the pollutants to ppb level.

TABLE V

Bulk Removal of Phenol in Mixed Bed & All Plastic Bed

| Date | HRT (hrs) | Phenol Concentration (mg/l) | | |
|---|---|---|---|---|
| | | INF | EFF-1 | EFF-2 |
| MAY 20 | 20.0 | 853.0 | 2.2 | 2.2 |
| MAY 21 | 12.0 | 935.0 | 1.9 | 1.5 |
| MAY 22 | 11.0 | 820.0 | 10.0 | 2.6 |
| MAY 23 | 12.0 | 845.0 | 17.2 | 4.9 |
| MAY 28 | 14.0 | 1031.0 | 39.0 | 5.8 |
| JUN 18 | 12.0 | 890.0 | 2.9 | 1.0 |
| JUL 17 | 13.0 | 1147.0 | 5.1 | 1.9 |
| JUL 18 | 13.0 | 1122.0 | 13.6 | 2.7 |
| JUL 19 | 13.0 | 1098.0 | 26.1 | 3.7 |
| JUL 23 | 13.3 | 1248.0 | 10.4 | 1.6 |
| JUL 30 | 15.2 | 1329.0 | 28.8 | 1.0 |
| JUL 31 | 15.2 | 1209.0 | 5.9 | 1.0 |
| AUG 1 | 15.2 | 1240.0 | 5.2 | 1.0 |
| Average | 13.1 | 1059.0 | 13.0 | 2.0 |

EXAMPLE V

Foamex polyurethane foam (PUF-2, a reticulated foam containing 15–20 pores per inch, ppi), 13000 series General Foam polyurethane foam (PUF-1, a smaller pore foam possessing about 60 ppi) or Tripack rings (made from polypropylene) were coated by a slurry of powdered activated carbon (PAC) by the procedure described below.

Into a 1 L beaker fitted with a magnetic stir bar was added 280 ml water. To this vigorously stirring liquid was then added 89.4 g of type C PAC (Calgon Corp). After complete wetting and suspension of the PAC (about 5 min) to this suspension was added 25 ml Dowfax 2A1 (Dow Chemical Corp) and then, after 1 minute, 120 ml of Synthemul latex adhesive suspension (Reichold Chemical Corp). After 2 to 3 min of stirring, the suspension was ready to be used for impregnation or coating. This amount of slurry could be used for coating 11.22 g of PUF-1, 12.41 g of PUF-2 and 89.13 g tripack rings, allowing a certain amount for wastage.

The two polyurethane foams were cut into 10 slabs each with 3"×0.5"×0.5" dimensions. Each slab was immersed in the above described slurry and squeezed four or five times to express all entrapped air. The excess slurry was removed from the slabs by passing the slabs through a pair of rollers set at 1.02 mm from each other. The slabs were then dried at room temperature for three days. A typical slab of the PUF-1 weighed 1.116 g prior to treatment and 3.997 g (dry weight) after treatment. A typical slab of PUF-2 weighed 1.267 g before treatment and 1.992 g after treatment (dry weight).

The coated slabs were cut into 0.5"×0.5"×0.5" +/−⅛" cubes.

The Tripack rings were immersed in the slurry and agitated for 10 seconds. Excess slurry was removed by simple draining. After three days drying, the coating and drying steps were repeated. A typical Tripack ring weighed 1.302 g. After one coating the ring weighed 1.403 g and after two coatings, 1.507 g (dry weight).

EXAMPLE VI

Into a glass column reactor as described in FIG. 1, were placed PAC-coated cubes PUF-2 prepared as described in Example V. Into a second identical column was placed a mixed media consisting of equal number of pieces of PUF-1, PUF-2 and Tripack rings, all PAC-coated, all prepared as describe in Example V. A mineral salts media supplemented with 750 ppm phenol, as described in Table VI, and sparged with air at a rate of 200 ml per minute was percolated though the reactors in an upflow fashion with a liquid residency time of one day, based on a void volume of 637 ml. The reactors were operated for 32.75 days whereupon interstitial biomass was removed. At 37.69 days the effluent phenol concentration in the two reactor were quite low (see Table VI). Operation of the reactors was continued until 37.84 days whereupon the reactors were challenged by increasing the influent feed phenol concentration to 2200 ppm. At 38.71 days it was noted that the effluent phenol concentration of the PUF-2-containing reactor had increased to a level 5 times greater than that of the mixed media reactor. Operation of the reactors was continued until 38.84 days whereupon the influent feed phenol concentration was increased to 2800 ppm. At 39.70 days it was noted that the effluent phenol concentration of the PUF-2-containing reactor had now increased to a level 31 times greater than that of the mixed media reactor. Operation of the reactors was continued until 39.84 days, whereon the influent feed phenol concentration was lowered to 750 ppm. At 40.35 hours the effluent phenol concentration returned to essentially the original 37.69 hour value.

EXAMPLE VII

Into a glass column reactor identical to that described in Example VI, were placed PAC-coated tripack rings prepared as described in Example V. Into a second identical column was placed a mixed media consisting of equal number of pieces of PUF-1, PUF-2 and Tripack rings, all PAC-coated, all prepared as describe in Example V. A mineral salts media supplemented with 750 ppm phenol and sparged with air at a rate of 200 ml per minute was percolated though the reactors in an upflow fashion with a liquid residency time of one day, based on a void volume of 637 ml. The reactors were operated for 32.75 days whereon interstitial biomass was removed. At 37.69 days the effluent phenol concentration in the two reactor were quite low (see Table VII). Operation of the reactors was continued until 37.84 days whereupon the reactors were challenged by increasing the influent feed phenol concentration to 2200 ppm. At 38.71 days it was noted that the effluent phenol concentration of the Tripack-containing reactor had increased to a level 123 times greater than that of the mixed media reactor. Operation of the reactors was continued until 38.84 days whereupon the influent feed phenol concentration was increased to 2800 ppm. At 39.70 days it was noted that the effluent phenol concentration of the tripack-containing reactor was now at a level 58 times greater than that of the mixed media reactor. Operation of the reactors was continued until 39.84 days, whereon the influent feed phenol concentration was lowered to 750 ppm. Even at 41.92 days the effluent phenol concentration of the Tripack-containing reactor had not returned to the original 37.69 hour value, being 2,200 times higher than the mixed media reactor this ratio being especially high since the phenol concentration of the mixed media has returned to such a low concentration level.

TABLE VI

COMPOSITION OF FEEDSTOCK CONTAINING 750 PPM PHENOL

| Chemical | g chemical per liter |
|---|---|
| $KH_2PO_4$ | 0.40 |
| $(NH_4)_2SO_4$ | 1.00 |
| $MgSO_4.7H_2O$ | 0.20 |
| NaCl | 0.10 |
| $CaCl_2.2H_2O$ | 0.10 |
| $NaHCO_3$ | 0.50 |
| Liquid Phenol (89.6% w/w) | 0.84 | pH was adjusted to 7.2 with 12 _sb,13 N NaOH

TABLE VII

COMPARISON OF PHENOL EFFLUENT FROM PAC-COATED PUF-2 AND MIXED MEDIA-CONTAINING ICBs CHALLENGED BY INCREASE OF PHENOL INFLUENT

| TIME, DAYS | EFFLUENT PHENOL, PPM | EFFLUENT PHENOL, PPM | |
|---|---|---|---|
| | | PUF-2 ICB | MIXED ICB |
| 37.69 | 750 | 0.06 | 0.02 |
| 37.84 | 2200 | — | — |
| 37.92 | " | 0.06 | 0.05 |
| 38.00 | " | 0.31 | 0.06 |
| 38.35 | " | 0.08 | 0.82 |
| 38.71 | " | 6.40 | 1.26 |
| 38.84 | 2800 | — | — |
| 38.88 | " | 8.36 | 0.74 |
| 38.97 | " | 24.5 | 1.35 |
| 39.35 | " | 5.74 | 2.78 |
| 39.70 | " | 907 | 29.3 |
| 39.84 | 750 | — | — |
| 39.92 | " | 333 | 13.4 |
| 40.35 | " | 0.03 | 1.02 |
| 40.77 | " | 0.21 | 0.46 |
| 41.35 | " | *nd | 0.19 |

TABLE VII-continued

COMPARISON OF PHENOL EFFLUENT FROM PAC-COATED PUF-2 AND MIXED MEDIA-CONTAINING ICBs CHALLENGED BY INCREASE OF PHENOL INFLUENT

| TIME, DAYS | EFFLUENT PHENOL, PPM | EFFLUENT PHENOL, PPM | |
|---|---|---|---|
| | | PUF-2 ICB | MIXED ICB |
| 41.92 | " | 0.06 | 0.11 |

*nd = none detected

TABLE VIII

COMPARISON OF PHENOL EFFLUENT FROM PAC-COATED TRIPACKS AND MIXED MEDIA-CONTAINING ICBs CHALLENGED BY INCREASE OF PHENOL INFLUENT

| TIME, DAYS | EFFLUENT PHENOL, PPM | EFFLUENT PHENOL, PPM | |
|---|---|---|---|
| | | TRIPACK ICB | MIXED ICB |
| 37.69 | 750 | 0.14 | 0.02 |
| 37.84 | 2200 | — | — |
| 37.92 | " | 24.8 | 0.05 |
| 38.00 | " | 54.5 | 0.06 |
| 38.35 | " | 200 | 0.82 |
| 38.71 | " | 155 | 1.26 |
| 38.84 | 2800 | — | — |
| 38.88 | " | 428 | 0.74 |
| 38.97 | " | 491 | 1.35 |
| 39.35 | " | 1085 | 2.78 |
| 39.70 | " | 1700 | 29.3 |
| 39.84 | 750 | — | — |
| 39.92 | " | 1334 | 13.4 |
| 40.35 | " | 988 | 1.02 |
| 40.77 | " | 60.9 | 0.46 |
| 41.35 | " | 348 | 0.19 |
| 41.92 | " | 242 | 0.11 |

TABLE IX

COMPARISON OF PHENOL EFFLUENT FROM PAC-COATED PUF-2 AND TRIPACK-CONTAINING ICBs CHALLENGED BY INCREASE OF PHENOL INFLUENT

| TIME, DAYS | PUF-2 ICB | TRIPACK ICB | MIXED MEDIA ICB |
|---|---|---|---|
| 37.69 | 0.06 | 0.14 | 0.02 |
| 37.92 | 0.06 | 24.80 | 0.05 |
| 38.00 | 0.31 | 54.50 | 0.06 |
| 38.35 | 0.08 | 200.20 | 0.82 |
| 38.71 | 6.40 | 155.10 | 1.26 |
| 38.88 | 8.36 | 428.10 | 0.74 |
| 38.97 | 24.50 | 490.70 | 1.35 |
| 39.35 | 5.74 | 1085.00 | 2.78 |
| 39.70 | 907.00 | 1700.00 | 29.30 |
| 39.92 | 333.00 | 1334.00 | 13.40 |
| 40.35 | 0.03 | 988.00 | 1.02 |
| 40.77 | 0.21 | 60.90 | 0.46 |
| 41.35 | 0.00 | 348.00 | 0.19 |
| 41.92 | 0.06 | 242.00 | 0.11 |

What is claimed is:

1. Process for purification of a fluid stream comprising one or more materials by biodegradation with one or more microorganisms capable of metabolizing one or more of said materials, said process comprising:
passing a fluid feed stream comprising one or more materials through a reactor containing a fixed biologically active biomass comprising a plurality of particulate open structures forming open or substantially open regions interdispersed with a plurality of particulate biologically active bodies, wherein said particulate bodies comprise from about 10 to about 70 volume percent of said biomass and said particulate open structures comprise from about 90 to about 30 volume percent of said biomass based on the total volume of said biomass, said bodies comprising a substrate and an effective amount of one or more aerobic or anaerobic microorganisms capable of metabolizing at least one of said materials in said feed stream under process conditions on, in or on and in said substrate and having a surface to volume ration which is at least about 5 times greater than the ratio of the surface of said open structure to the volume of said open region formed by said open structure, said bodies and said open regions distributed in said biomass to allow contact between said feed stream passing through said open or substantially open regions and a substantial portion of the internal and external surfaces of said bodies adjacent to said regions to provide an effluent stream in which the concentration of at least one of said materials is less than the concentration of said material in said feed stream.

2. Process of claim 1 wherein said fluid stream is an aqueous stream.

3. Process of claim 2 wherein said open or substantially open open regions are formed from said particulate open structures comprising a rigid open framework skeletally comprising said open structures and having a plurality of passages therethrough.

4. Process of claim 3 wherein said open structure comprises a body wherein said rigid open framework comprises a plurality of spaced longitudinal or substantially longitudinal ribs converging at opposing apexes of said body.

5. Process of claim 4 wherein framework comprises at least one latitudinal rib about the circumference of said body.

6. Process of claim 5 wherein said body further comprises one or more interior ribs formed to two or more of said longitudinal and latitudinal ribs which define said passages through said body.

7. Process of claim 6 wherein said body further comprises internal fins or vanes which further define said passages through said body.

8. Process of claim 7 wherein said body is a spherical or substantially spherical body.

9. Process of claim 8 wherein said longitudinal ribs converge on each pole of said spherical or substantially spherical body and said at least one latitudinal rib is at or about the equator of said spherical or substantially spherical body, and wherein a plurality of interior ribs and interior fins or vanes are parallel or substantially parallel to the axis of said spherical or substantially spherical body.

10. Process of claim 3 wherein said particulate bodies are porous particulate bodies.

11. Process of claim 10 wherein said porous particulate bodies have at least 2 pores per inch.

12. Process of claim 11 wherein said porous particulate bodies have from about 2 to about 60 pores per inch.

13. Process of claim 12 wherein said porous particulate bodies have from about 5 to about 30 pores per inch.

14. Process of claim 13 wherein said porous particulate bodies have from about 10 to about 20 pores per inch.

15. Process of claim 13 wherein said particulate bodies and said porous particulate open structures are formed of a polymeric material.

16. Process of claim 15 wherein said porous particulate bodies are formed of a polyurethane foam.

17. Process of claim 16 wherein said polyurethane foam is formed of a hydrophobic polyurethane.

18. Process of claim 16 wherein said porous particulate bodies comprises a porous substrate and one or more absorbent for one or more of said materials in said feed stream, on, in, or on and in said substrate.

19. Process of claim 16 wherein said absorbent is activated carbon.

20. Process of claim 16 wherein said microorganisms are aerobic microorganisms and said process further comprises passing a gas comprising an effective amount of oxygen through said reactor.

21. Process of claim 20 wherein the concentration of at least one material is reduced to less than about 2 parts per million at an hydraulic residence time of under about 24 hours.

22. Process of claim 21 where the hydraulic residence time is less than about 15 hours.

23. Process of claim 21 wherein the concentration of at least one material is reduced to less than about 20 parts per billion at a hydraulic residence time of less than 24 hours.

24. Process of claim 23 where the hydraulic residence time is less than about 15 hours.

25. Process of claim 12 wherein the particle size of said porous particulate bodies and said porous particulate elements is from about 0.1 to about 12 inches.

26. Process of claim 25 wherein said particle size is from about 0.5 to about 5 inches.

27. Process of claim 26 wherein particle size is from about 1 to about 2 inch.

28. Process of claim 1 wherein said fluid stream is a gaseous stream.

29. Process of claim 1 wherein said porous particulate bodies comprise from about 20 to about 60 volume percent of said biomass and said particulate open structures comprise from about 80 to about 40 volume percent of said biomass.

30. Process of claim 29 wherein said porous particulate bodies comprise from about 30 to about 50 volume percent of said biomass and said particulate open structures comprise from about 70 to about 50 volume percent of said biomass.

31. Process of claim 1 wherein the concentration of a pollutant in the effluent stream increases by 25% of the increment of the concentration of the said, pollutant in the influent within about one hydraulic residence time or less.

32. Process of claim 31 wherein the concentration of a pollutant in the effluent stream increases by 10% of the increment of the concentration of the said pollutant in the influent within about one HRT or less.

33. Process of claim 32 wherein the concentration of a pollutant in the effluent stream increases by 1% of the increment of the concentration of the said pollutant in the influent within about one HRT or less.

34. Process of claim 1 wherein said bodies and said open structures are positioned such that at least about 50 area % of the total surface area of said bodies of at least about 50% of said bodies is adjacent to said open structure.

35. Process of claim 34 wherein said bodies and said open structures are positioned such that at least about 60 area % of the total surface area of said bodies of at least about 60% of said bodies is adjacent to said open structure.

36. Process of claim 35 wherein said bodies and said open structures are positioned such that at least about 80 area % of the total surface area of said bodies of at least about 80% of said bodies is adjacent to said open structure.

37. Process of claim 36 wherein said bodies have a surface to volume ratio which is at least about 5 times greater than the ratio of the surface of said open structure to the volume of said open structure.

38. Process of claim 1 wherein said particulate bodies and particulate open structures are distributed in said biomass in a homogeneous or substantially homogeneous fashions.

39. An apparatus for purification of a fluid stream comprising one or more materials by biodegradation with one or more microorganisms capable of metabolizing one or more of said materials, said apparatus comprising:

a reactor having contained therein a fixed biologically active biomass comprising a plurality of particulate open structures forming of open or substantially open regions interdispersed with a plurality of particulate biologically active bodies, wherein said particulate bodies comprised from about 10 to about 70 volume percent of said biomass and said particulate open structures comprise from about 90 to about 30 volume percent of said biomass based on the total volume of said biomass, said bodies comprising a substrate and an effective amount of one or more aerobic or anaerobic microorganisms capable of metabolizing at least one of said materials in said feed stream under process conditions on, in or on and in said substrate and having a surface to volume ratio which is at least about 5 times greater than the ratio of the surface of said open structure to the volume of said open region formed by said open structure, said bodies and said open regions distributed in said biomass to allow contact between said feed stream passing through said open or substantially open regions and a substantial portion of the internal and external surfaces of said bodies adjacent to said open regions.

40. Apparatus of claim 39 wherein said bodies and said open structures are positioned such that at least about 50 area % of the total surface area of said bodies of at least about 50 of said bodies is adjacent to said open structure.

41. Apparatus of claim 40 wherein said bodies and said open structures are positioned such that at least about 60 area % of the total surface area of said bodies of at least about 60% of said bodies is adjacent to said open structure.

42. Apparatus of claim 41 wherein said bodies and said open structures are positioned such that at least about 80 area % of the total surface area of said bodies of at least about 80% of said bodies is adjacent to said open structure.

43. Apparatus of claim 42 wherein said particulate bodies and particulate open structures are distributed in said biomass in a homogeneous or substantially homogeneous fashions.

44. Apparatus of claim 43 wherein said open or substantially open regions are formed from particulate porous open structures comprising a rigid open framework skeletally comprising said open structures and having a plurality of passages therethrough.

45. Apparatus of claim 44 wherein said open structure comprises a body wherein said rigid open framework comprises a plurality of spaced longitudinal or substantially longitudinal ribs converging at opposing apexes of said body.

46. Apparatus of claim 43 wherein said particulate bodies are porous particulate bodies.

47. Apparatus of claim 46 wherein said porous particulate bodies have at least 2 pores per inch.

48. Apparatus of claim 47 wherein said porous particulate bodies have from about 5 to about 30 pores per inch.

49. Apparatus of claim 46 wherein the particle size of said porous particulate bodies and said porous particulate open structures is from about 0.1 to about 12 inches.

50. Apparatus of claim 46 wherein said porous particulate bodies comprise from about 30 to about 50 volume percent of said biomass and said porous particulate open structures comprise from about 70 to about 50 volume percent of said biomass.

51. Apparatus of claim 46 wherein said porous particulate bodies and said porous particulate open structures are formed of a polymeric material.

52. Apparatus of claim 51 wherein said porous particulate bodies are formed of a polyurethane foam.

53. Apparatus of claim 52 wherein said polyurethane foam is formed of a hydrophobic polyurethane.

54. Apparatus of claim 51 wherein said porous particulate bodies comprises a porous substrate and one or more absorbent for one or more of said materials in said feed stream, on, in, or on and in said substrate.

55. Apparatus of claim 54 wherein said absorbent is activated carbon.

56. Apparatus of claim 46 wherein said microorganisms are aerobic microorganisms and said gas comprises an effective amount of oxygen.

57. A biomass of claim 46 wherein said bodies have a surface to volume ratio which is at least about 5 times greater than the ratio of the surface of said open structure to the volume of said open structure.

58. An apparatus of claim 39 wherein said bodies have a surface to volume ratio which is at least about 5 times greater than the ratio of the surface of said open structure to the volume of said open structure.

59. A biomass for use in an apparatus for purification of a fluid stream comprising one or more materials by biodegradation with one or more microorganisms capable of metabolizing one or more of said materials, said biomass comprising a plurality of particulate elements forming open or substantially open regions interdispersed with a plurality of particulate biologically active bodies, wherein said particulate bodies comprised from about 10 to about 70 volume percent of said biomass and said particulate open structures comprise from about 90 to about 30 volume percent of said biomass, said bodies comprising a substrate and an effective amount of one or more aerobic or anaerobic microorganisms capable of metabolizing at least one of said materials in said feed stream under process conditions on, in or on and in said substrate and having a surface to volume ratio which is at least about 5 times greater than the ratio of the surface of said open structure to the volume of said open region formed by said open structure, said bodies and said open regions distributed in said biomass to allow contact between said feed stream passing through said open or substantially open regions and a substantial portion of the internal and external surfaces of said bodies adjacent to said open regions to provide an effluent stream in which the concentration of at least one of said materials is less than the concentration of said material in said feed stream.

60. Biomass of claim 59 wherein said bodies and said open structures are positioned such that at least about 50 area % of the total surface area of said bodies of at least about 50% of said bodies is adjacent to said open structure.

61. Biomass of claim 60 wherein said bodies and said open structures are positioned such that at least about 60 area % of the total surface area of said bodies of at least about 60% of said bodies is adjacent to said open structure.

62. Biomass of claim 61 wherein said bodies and said open structures are positioned such that at least about 80 area % of the total surface area of said bodies of at least about 80% of said bodies is adjacent to said open structure.

63. Biomass of claim 59 wherein said particulate bodies and particulate open structures are distributed in said biomass in a homogeneous or substantially homogeneous fashions.

64. Biomass of claim 63 wherein said open or substantially open regions are formed from particulate porous open structures comprising a rigid open framework skeletally comprising said open structures and having a plurality of passages therethrough.

65. Biomass of claim 67 wherein said open structure comprises a body wherein said rigid open framework comprises a plurality of spaced longitudinal or substantially longitudinal ribs converging at opposing apexes of said body.

66. Biomass of claim 63 wherein said particulate bodies are porous particulate bodies.

67. Process of claim 66 wherein said porous particulate bodies have at least 2 pores per inch.

68. Biomass of claim 67 wherein said porous particulate bodies have from about 5 to about 30 pores per inch.

69. Biomass of claim 66 wherein the particle size of porous particulate bodies and said porous particulate open structures is from about 0.1 to about 12 inches.

70. Biomass of claim 66 wherein said porous particulate bodies comprise from about 30 to about 50 volume percent of said biomass and said porous particulate open structures comprise from about 70 to about 50 volume percent of said biomass.

71. Biomass of claim 66 wherein said porous particulate bodies and said porous particulate open structures are formed of a polymeric material.

72. Biomass of claim 71 wherein said porous particulate bodies are formed of a polyurethane foam.

73. Biomass of claim 72 wherein said polyurethane foam is formed of a hydrophobic polyurethane.

74. Biomass of claim 72 wherein said porous particulate bodies comprises a porous substrate and one or more absorbent for one or more of said materials in said feed stream, on, in, or on and in said substrate.

75. Biomass of claim 74 wherein said absorbent is activated carbon.

76. Biomass of claim 75 wherein said microorganisms are aerobic microorganisms.

77. An apparatus for purification of a fluid stream comprising one or more materials by biodegradation with one or more microorganisms capable of metabolizing one or more of said materials, said apparatus comprising:

a reactor having contained therein a fixed biologically active biomass comprising a plurality of particulate open structures forming open or substantially open open regions interdispersed with a plurality of particulate biologically active bodies, wherein said particulate bodies comprised from about 10 to about 70 volume percent of said biomass and said particulate open structures comprise from about 90 to about 30 volume percent of said biomass based on the total volume of said biomass, said bodies comprising a substrate capable of supporting the growth of an effective amount of one or more aerobic or anaerobic microorganisms capable of metabolizing at least one of said materials in said feed stream under process conditions on, in or on and in said substrate and having a surface to volume ratio which is at least 5 times greater than the ratio of the surface of said open structure to the volume of said open region formed by said open structure, said bodies and said open regions distributed in said biomass to allow contact between said feed stream passing through said open or substantially open spaces and a substantial portion of the internal and external surfaces of said bodies adjacent to said open regions to provide an effluent stream in which the concentration of at least one of said materials is less than the concentration of said material in said feed stream.

78. Apparatus of claim 77 wherein said bodies and said open structures are positioned such that at least about 50 area % of the total surface area of said bodies of at least about 50% of said bodies is adjacent to said open structure.

79. Apparatus of claim 78 wherein said bodies and said open structures are positioned such that at least about 60 area % of the total surface area of said bodies of at least about 50% of said bodies is adjacent to said open structure.

80. Apparatus of claim 79 wherein said bodies and said open structures are positioned such that at least about 80 area % of the total surface area of said bodies of at least about 80% of said bodies is adjacent to said open structure.

81. Apparatus of claim 78 wherein said particulate bodies and particulate open structures are distributed in said biomass in a homogeneous or substantially homogeneous fashions.

82. Apparatus of claim 81 wherein said open or substantially open regions are formed from particulate porous open structures comprising a rigid open framework skeletally comprising said open structures and having a plurality of passages therethrough.

83. Apparatus of claim 82 wherein said element comprises a body wherein said rigid open framework comprises a plurality of spaced longitudinal or substantially longitudinal ribs converging at opposing apexes of said body.

84. Apparatus of claim 81 wherein said particulate bodies are porous particulate bodies.

85. Apparatus of claim 84 wherein said porous particulate bodies have at least 2 pores per inch.

86. Apparatus of claim 85 wherein said porous particulate bodies have from about 5 to about 30 pores per inch.

87. Apparatus of claim 84 where the particle size of said porous particulate bodies and said porous particulate elements is from about 0.1 to about 12 inches.

88. Apparatus of claim 84 wherein said porous particulate bodies comprise from about 30 to about 50 volume percent of said biomass and said porous particulate elements comprise from about 70 to about 50 volume percent of said biomass.

89. Apparatus of claim 88 wherein said porous particulate bodies are formed of a polyurethane foam.

90. Apparatus of claim 89 wherein said polyurethane foam is formed of a hydrophobic polyurethane.

91. Apparatus of claim 89 wherein said porous particulate bodies comprises a porous substrate and activated carbon, on, in, and on and in said substrate.

92. An apparatus of claim 84 wherein said bodies have a surface to volume ratio which is at least about 5 times greater than the ratio of the surface of said open structure to the volume of said open structure.

93. A biomass for use in an apparatus for purification of a fluid stream comprising one or more materials by biodegradation with one or more microorganisms capable of metabolizing one or more of said materials, said biomass comprising a plurality of particulate open structures forming open or substantially open regions and a plurality of particulate biologically active bodies, wherein said particulate bodies comprised from about 10 to about 70 volume percent of said biomass and said particulate open structures comprise from about 90 to about 30 volume percent of said biomass based on the total volume of said biomass, said bodies comprising a substrate capable or supporting the growth of an effective amount of one or more aerobic or anaerobic microorganisms capable of metabolizing at least one of said materials in said feed stream under process conditions on, in or on and in said substrate and having a surface to volume ratio which is at least 5 times greater than the ratio of the surface of said open structure to the volume of said open region formed by said open structure, said bodies and said open regions distributed in said biomass to allow contact between said feed stream passing through said open or substantially open regions and a substantial portion of the internal and external surfaces of said bodies adjacent to said open regions to provide an effluent stream in which the concentration of at least one of said materials is less than the concentration of said material in said feed stream.

94. Biomass of claim 93 wherein said bodies and said elements are positioned such that at least about 50 area % of the total surface area of said bodies of at least about 50% of said bodies is adjacent to said element.

95. Biomass of claim 94 wherein said bodies and said elements are positioned such that at least about 60 area % of the total surface area of said bodies of at least about 50% of said bodies is adjacent to said element.

96. Biomass of claim 95 wherein said bodies and said elements are positioned such that at least about 80 area % of the total surface area of said bodies of at least about 80% of said bodies is adjacent to said element.

97. Biomass of claim 94 wherein said particulate bodies and particulate elements are distributed in said biomass in a homogeneous or substantially homogeneous fashions.

98. Biomass of claim 97 wherein said open or substantially open spaces are formed from particulate porous elements comprising a rigid open framework skeletally comprising said elements and having a plurality of passages therethrough.

99. Biomass of claim 98 wherein said open structure comprises a body wherein said rigid open framework comprises a plurality of spaced longitudinal or substantially longitudinal ribs converging at opposing apexes of said body.

100. Biomass of claim 97 wherein said particulate bodies are porous particulate bodies.

101. Biomass of claim 100 wherein said porous particulate bodies have at least 2 pores per inch.

102. Biomass of claim 101 wherein said porous particulate bodies have from about 5 to about 30 pores per inch.

103. Biomass of claim 100 wherein the particle size of said porous particulate bodies and said porous particulate open structures is from about 0.1 to about 12 inches.

104. Biomass of claim of claim 100 wherein said porous particulate bodies comprise from about 30 to about 50 volume percent of said biomass and said porous particulate open structures comprise from about 70 to about 50 volume percent of said biomass.

105. Biomass of claim 104 wherein said porous particulate bodies are formed of a polyurethane foam.

106. Biomass of claim 105 wherein said polyurethane foam is formed of a hydrophobic polyurethane.

107. Biomass of claim 105 wherein said porous particulate bodies comprises a porous substrate and activated carbon, on, in, or on and in said substrate.

108. A biomass of claim 100 wherein said bodies have a surface to volume ratio which is at least about 5 times greater than the ratio of the surface of said open structure to the volume of said open structure.

* * * * *